(12) United States Patent
Jang et al.

(10) Patent No.: US 12,532,054 B2
(45) Date of Patent: Jan. 20, 2026

(54) IMAGE ACQUISITION APPARATUS AND METHOD OF ACQUIRING IMAGES USING A MULTISPECTRAL IMAGE SENSOR

(71) Applicant: SAMSUNG ELECTRONICS CO., LTD., Suwon-si (KR)

(72) Inventors: Soongeun Jang, Suwon-si (KR); Woo-Shik Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 108 days.

(21) Appl. No.: 18/423,013

(22) Filed: Jan. 25, 2024

(65) Prior Publication Data

US 2024/0430549 A1 Dec. 26, 2024

(30) Foreign Application Priority Data

Jun. 21, 2023 (KR) .................. 10-2023-0079931

(51) Int. Cl.
*H04N 23/16* (2023.01)
*H04N 23/56* (2023.01)
(Continued)

(52) U.S. Cl.
CPC ............ *H04N 23/16* (2023.01); *H04N 23/56* (2023.01); *H04N 23/71* (2023.01); *H04N 23/843* (2023.01); *H04N 23/88* (2023.01)

(58) Field of Classification Search
CPC ........ H04N 23/16; H04N 23/56; H04N 23/71; H04N 23/843; H04N 23/88; H04N 25/79;
(Continued)

(56) References Cited

U.S. PATENT DOCUMENTS 8,130,292 B2 3/2012 Lee
8,134,618 B2 3/2012 Ajito et al.
(Continued)

FOREIGN PATENT DOCUMENTS

CN 115701128 A 2/2023
WO 2019/211484 A1 11/2019
(Continued)

OTHER PUBLICATIONS

Ja-Won Seo et al., "A Novel Anti-Vignetting Method for Color Shading Artifact Suppression," 2013 IEEE International Conference on Consumer Electronics (ICCE), 2013, pp. 250-251 (Total 2 pages).

(Continued)

*Primary Examiner* — Padma Haliyur
(74) *Attorney, Agent, or Firm* — Sughrue Mion, PLLC

(57) ABSTRACT

An image acquisition apparatus may include a multispectral image sensor configured to acquire an image of at least one object in an environment in which at least one illumination source exists, through eight or more channels with minimum overlap between the channels, and a processor configured to estimate illumination spectral data of the acquired image by using channel signals corresponding to the eight or more channels, and perform lens shading correction on the acquired image, based on the estimated illumination spectral data.

17 Claims, 25 Drawing Sheets

(51) Int. Cl.
*H04N 23/71* (2023.01)
*H04N 23/84* (2023.01)
*H04N 23/88* (2023.01)

(58) Field of Classification Search
CPC ........ H04N 23/11; H04N 23/45; H04N 23/74; H04N 25/11; H04N 25/13; H04N 25/131; H04N 25/135; H04N 25/611; H04N 23/10; H04N 23/70; H04N 23/13; H04N 23/84; H04N 25/61; G01J 2003/2806; G01J 2003/282; G01J 3/28; G01J 3/36; G01J 2003/2826; G01J 3/2823; G01J 3/0294; G01J 3/10; G01J 2003/2866; G06T 5/92; G06N 20/00

See application file for complete search history.

(56) References Cited

U.S. PATENT DOCUMENTS

| | | | | |
|---|---|---|---|---|
| 8,588,523 | B2 | 11/2013 | Barron et al. | |
| 8,749,672 | B2 | 6/2014 | Komiya et al. | |
| 2012/0307116 | A1* | 12/2012 | Lansel | H04N 23/843 348/E9.005 |
| 2015/0015692 | A1* | 1/2015 | Smart | G01J 3/2823 348/77 |
| 2015/0070528 | A1* | 3/2015 | Kikuchi | H04N 23/95 348/224.1 |
| 2016/0078317 | A1* | 3/2016 | Gu | G06V 10/60 382/190 |
| 2018/0010966 | A1* | 1/2018 | Ichikawa | H04N 23/12 |
| 2019/0228507 | A1* | 7/2019 | Menon | G06T 5/73 |
| 2020/0110208 | A1* | 4/2020 | Darty | G01J 3/0264 |
| 2022/0046149 | A1* | 2/2022 | Nakamura | G03B 7/00 |
| 2022/0156903 | A1 | 5/2022 | McCall et al. | |
| 2022/0412798 | A1* | 12/2022 | Siess | G01J 3/0205 |
| 2023/0066267 | A1 | 3/2023 | Kim et al. | |
| 2023/0148951 | A1* | 5/2023 | Thatcher | A61B 5/7275 382/128 |
| 2023/0222654 | A1* | 7/2023 | Fan | G06V 10/454 382/128 |
| 2025/0005761 | A1* | 1/2025 | Thatcher | G16H 50/70 |
| 2025/0184584 | A1* | 6/2025 | Liang | G01J 3/2823 |

FOREIGN PATENT DOCUMENTS

| | | | | |
|---|---|---|---|---|
| WO | 2021/105398 A1 | 6/2021 | | |
| WO | WO-2023164271 A1 * | 8/2023 | .......... | G06T 7/0002 |

OTHER PUBLICATIONS

Yuanjie Zheng et al., "Single-Image Vignetting Correction from Gradient Distribution Symmetries," IEEE Transactions on Pattern Analysis and Machine Intelligence, vol. 35, No. 6, Jun. 2013, pp. 1480-1494 (Total 15 pages), DOI 10.1109/TPAMI.2012.210.

Yinqiang Zheng et al., "Illumination and Reflectance Spectra Separation of a Hyperspectral Image Meets Low-Rank Matrix Factorization," 2015 IEEE Conference on Computer Vision and Pattern Recognition (CVPR), pp. 1779-1787 (Total 9 pages).

Daniel Hernandez-Juarez et al., "A Multi-Hypothesis Approach to Color Constancy," 2020 IEEE/CVF Conference on Computer Vision and Pattern Recognition (CVPR), pp. 2267-2277 (Total 11 Pages) DOI 10,1109/CVPR42600.2020.00234.

Communication issued on Oct. 24, 2024 from the European Patent Office for European Patent Application No. 24179884.2.

Communication dated Nov. 21, 2025, issued by the European Patent Office in European Application No. 24 179 884.2.

* cited by examiner

IMAGE ACQUISITION APPARATUS AND METHOD OF ACQUIRING IMAGES USING A MULTISPECTRAL IMAGE SENSOR

CROSS-REFERENCE TO RELATED APPLICATION

This application is based on and claims priority under 35 U.S.C. § 119 to Korean Patent Application No. 10-2023-0079931, filed on Jun. 21, 2023, in the Korean Intellectual Property Office, the disclosure of which is incorporated by reference herein in its entirety.

BACKGROUND

1. Field

The disclosure relates to an image acquisition apparatus and a method of acquiring images.

2. Description of the Related Art

Cameras generally used in electronic devices (e.g., smartphones) include RGB image sensors. An RGB image sensor may be configured to acquire images using three channels including an R channel, a G channel, and a B channel. Cameras or electronic devices may be configured to generate or correct images based on signals acquired from the RGB image sensor. For example, a camera or an electronic device may be configured to estimate a color temperature of an illumination source, based on signals acquired through three channels of an RGB image sensor, and correct images, based on the estimated color temperature.

However, as illumination sources may have spectral characteristics even at a same color temperature, it may be difficult to accurately distinguish different illumination sources only using color temperatures. Accordingly, there may be a need for a technology for accurately distinguishing and estimating illumination sources having different spectral characteristics, and accurately correcting images by using information regarding the estimated illumination sources.

SUMMARY

One or more embodiments provide an image acquisition apparatus and a method of acquiring images. Technical goals of the disclosure are not limited to the aforementioned technical goal, and other technical goals may be derived from the following embodiments.

Additional aspects will be set forth in part in the description which follows and, in part, will be apparent from the description, or may be learned by practice of the presented embodiments of the disclosure.

According to an aspect of the disclosure, an image acquisition apparatus may include: a multispectral image sensor configured to acquire an image of at least one object in an environment in which at least one illumination source exists, through eight or more channels; and a processor configured to estimate illumination spectral data of the image by using channel signals corresponding to the eight or more channels, and perform lens shading correction on the image, based on the illumination spectral data.

The processor may be further configured to generate a correction map with respect to each of the eight or more channels by performing linear interpolation on correction data included in a correction table corresponding to the illumination spectral data.

The correction table may include the correction data for each of the eight or more channels, and the correction data may include at least one of a scale factor, an offset, an incidence angle, and a curve fitting coefficient, corresponding to the illumination spectral data.

The processor may be further configured to perform, by using the correction map, the lens shading correction on all of raw images acquired from the multispectral image sensor.

The processor may be further configured to estimate the illumination spectral data, based on eight or more basis vectors related to reflection characteristics of the at least one object included in the image, a number of the channels, and a number of pixels in the image.

The processor may be further configured to estimate the illumination spectral data by using a pre-trained machine learning model.

The processor may be further configured to segment the image into a plurality of areas and estimate the illumination spectral data for each of the plurality of areas.

The illumination spectral data may include at least one of spectrum data including intensity of the channel signals according to wavelength, a color vector of the illumination source in a color space, a color temperature of the illumination source, and a predetermined illumination type corresponding to the illumination source.

The processor may be further configured to further perform white balance correction on the image on which the lens shading correction has been performed, based on the illumination spectral data.

In the multispectral image sensor, color calibration may be performed on the at least one illumination source.

According to another aspect of the present disclosure, an image acquisition apparatus may include: a multispectral image sensor configured to acquire a first image of at least one object, in an environment in which at least one illumination source exists, through eight or more first channels; an image sensor configured to acquire, through fewer than four second channels, a second image of the at least one object in the environment in which the at least one illumination source exists; and a processor configured to estimate illumination spectral data of the first image by using channel signals corresponding to the eight or more first channels, and perform lens shading correction on the second image, based on the illumination spectral data.

The processor may be further configured to generate a correction map with respect to each of the second channels by performing linear interpolation on correction data included in a correction table corresponding to the illumination spectral data.

The processor may be further configured to perform parallax correction on the first image and the second image.

The processor may be configured to further perform, based on the illumination spectral data, white balance correction on the second image on which the lens shading correction has been performed.

According to another aspect of the disclosure, t method of acquiring images may include: acquiring a first image of at least one object in an environment in which at least one illumination source exists, through eight or more first channels, by using a multispectral image sensor; estimating illumination spectral data of the first image by using channel signals corresponding to the eight or more first channels; and performing lens shading correction on the first image or a second image acquired by an image sensor different from the multispectral image sensor, based on the illumination spectral data.

The image sensor may be configured to acquire, through fewer than four second channels, the second image of the at least one object in the environment in which the at least one illumination source exists, and the performing of the lens shading correction may include: generating a correction map for each of the first channels or each of the second channels by performing linear interpolation on correction data included in a correction table corresponding to the illumination spectral data; and performing the lens shading correction on the first image or the second image by using the correction map.

The performing of the lens shading correction may include: performing the lens shading correction on all of raw images acquired from the multispectral image sensor, by using the correction map generated for each of the first channels, or performing the lens shading correction on all of the raw images, using the correction map generated for each of the second channels.

The correction table may include first correction data with respect to each of the first channels or second correction data with respect to each of the second channels, and the first correction data and the second correction data may include at least one of a scale factor, an offset, an incidence angle, and a curve fitting coefficient, corresponding to the illumination spectral data.

The method may further include performing parallax correction on the first image and the second image.

The method may further include, based on the illumination spectral data, performing white balance correction on the first image or the second image, on which the lens shading correction has been performed.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
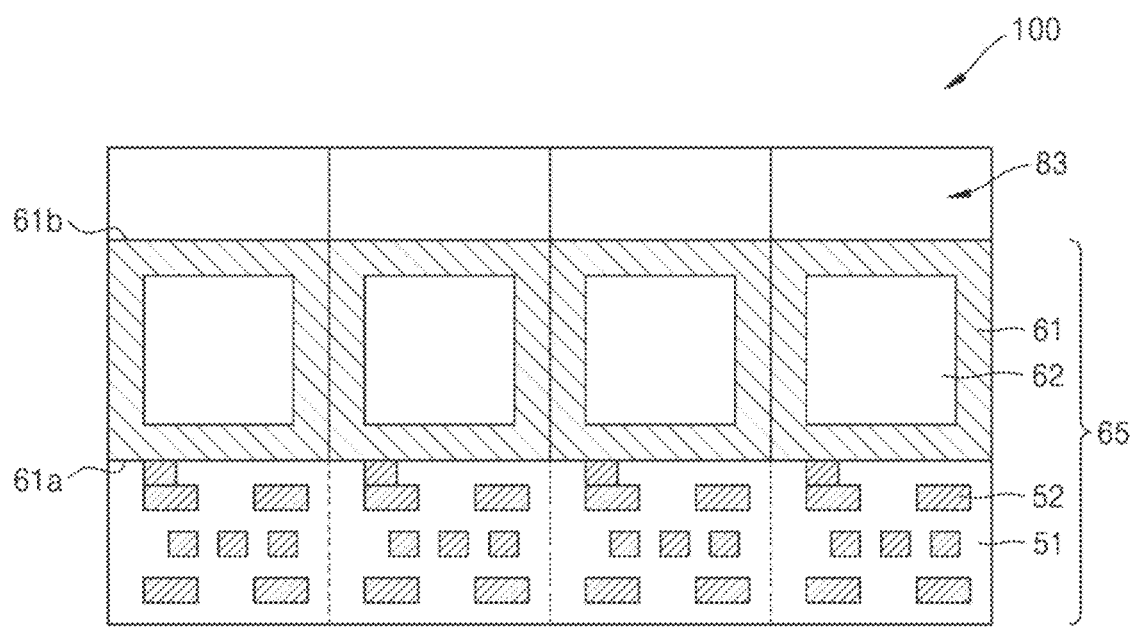
FIG. 1 is a cross-sectional view of a multispectral image sensor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The general terms which are currently and widely used are selected in consideration of functions of structural elements in the various embodiments of the embodiments of the present disclosure. However, meanings of the terms may be changed according to intention, a judicial precedence, the appearance of a new technology, and the like. In addition, in certain cases, terms may be arbitrarily selected in particular cases. In such a case, the meaning of the terms will be described in detail at the corresponding portion in the description of the disclosure. Therefore, the terms used in the various embodiments of the disclosure will be defined based on the meanings of the terms and the descriptions provided herein.

In the descriptions of embodiments, when a portion is connected to another portion, the connection includes a case in which the portions are electrically connected to each other with another component therebetween, as well as a direct connection between the portions. In addition, when a portion is referred to as including a component, this means that the portion may further include other components and does not exclude the other components, unless specifically described otherwise.

The terms 'configured', 'included' used in the embodiment are not construed as necessarily including all of components or steps described in the specification; some components or steps may be not included, or additional components or steps may be further included.

In addition, the terms 'first', 'second' may be used herein to describe various elements, but these elements will not be limited by these terms. These terms are only used to distinguish one component from another component.

The following descriptions of the embodiment are not construed as limiting the scope of the present disclosure, and those descriptions easily inferred by those skilled in the art should be construed as being within the scope of the embodiments. Hereinafter, embodiments for examples only will now be described in detail with reference to the accompanying drawings.

FIG. 1 is a cross-sectional view of a multispectral image sensor 100 according to an embodiment.

The multispectral image sensor 100 shown in FIG. 1 may include, for example, a complementary metal oxide semiconductor (CMOS) image sensor or a charge coupled device (CCD) image sensor.

Referring to FIG. 1, the multispectral image sensor 100 may include a pixel array 65 and a spectral filter 83 provided on the pixel array 65. Here, the pixel array 65 may include a two-dimensional arrangement of a plurality of pixels, and the spectral filter 83 may include a plurality of resonators that are aligned with the plurality of pixels in a one-to-one correspondence. FIG. 1 illustrates an example in which the pixel array 65 includes four pixels and the spectral filter 83 includes four resonators.

Each pixel in the pixel array 65 may include a photodiode 62, which is a photoelectric conversion element, and a driving circuit 52 configured to drive the photodiode 62. The photodiode 62 may be provided to be buried into a semiconductor substrate 61. A silicon substrate, for example, may be used as the semiconductor substrate 61. However, the disclosure is not limited thereto. A wiring layer 51 may be provided at a bottom surface 61a of the semiconductor substrate 61, and in the wiring layer 51, for example, the driving circuit 52 such as a metal oxide semiconductor field effect transistor (MOSFET) may be provided.

The spectral filter 83 including the plurality of resonators is provided on a top surface 61b of the semiconductor substrate 61. Each of the resonators may be provided to transmit light of a desired specific wavelength range. Each of the resonators may include reflective layers provided apart from each other and a cavity provided between the reflective layers. Each of the reflective layers may include a metal reflective layer or a Bragg reflective layer. Each cavity may be provided to resonate light of a desired specific wavelength range.

The spectral filter 83 may include one or more function layers configured to improve transmittance of light being transmitted through the spectral filter 83 and incident to the photodiode 62. A function layer may include a dielectric layer or a dielectric pattern with an adjusted refractive index. In addition, the function layer may include, for example, an antireflection layer, a condenser lens, a color filter, a short-wavelength absorption filter, a long-wavelength blocking filter, and the like. However, this is only an example.

Figure 2A:
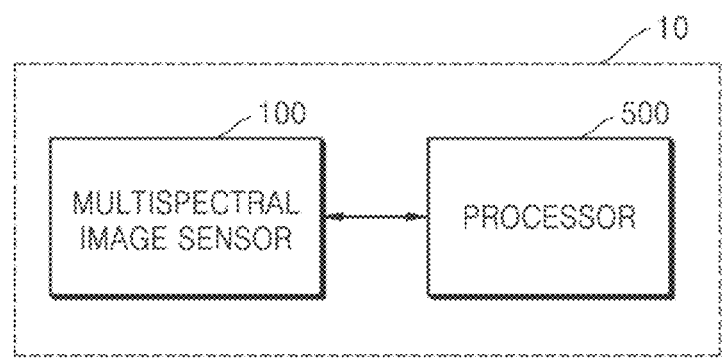
FIG. 2A is a block diagram illustrating a structure of an image acquisition apparatus according to an embodiment.

FIG. 2A is a block diagram illustrating a structure of an image acquisition apparatus 10 according to an embodiment.

Referring to FIG. 2A, the image acquisition apparatus 10 according to an embodiment may include the multispectral image sensor 100 and a processor 500. However, only components related to the present embodiment are illustrated in the image acquisition apparatus 10 shown in FIG. 2A. Accordingly, the image acquisition apparatus 10 may further include other components in addition to the components shown in FIG. 2A.

The multispectral image sensor 100 may include a sensor configured to detect or sense light of various kinds of wavelength bands. For example, the multispectral image sensor 100 may include sixteen channels or thirty-one channels. However, the disclosure is not limited thereto, and the multispectral image sensor 100 may include an arbitrary number of channels, e.g., four or more.

The multispectral image sensor 100 may be configured to adjust a central wavelength, a bandwidth, and an amount of transmission of light absorbed through each channel, such that each channel may sense light of a desired band. Images acquired by the multispectral image sensor 100 may include multispectral images or hyperspectral images.

In an environment where at least one illumination source exists, the multispectral image sensor 100 may be configured to acquire an image of at least one object through a plurality of channels. For example, the multispectral image sensor 100 may be configured to acquire images by dividing a relatively wide wavelength band, which includes a visible-light band, an infrared band, an ultraviolet band, and the like, into the plurality of channels. The multispectral image sensor 100 may be configured to acquire the images using all of available channels. Alternatively, the multispectral image sensor 100 may be configured to acquire the images by selecting certain channels.

The multispectral image sensor 100 may include filters capable of transmitting light according to bands in each of the channels. A multispectral filter array (MSFA) may indicate filters corresponding to an entire band sensed by the multispectral image sensor 100. The MSFA may have a one-dimensional or two-dimensional arrangement. For example, when the number of channels is sixteen, the MSFA may have a 4×4 arrangement.

A filter in each channel may be configured to transmit light of a particular band. To do so, the filter may have a resonance structure. A transmission band of the filter may be determined according to the resonance structure. For example, the transmission band may be adjusted according to a material included in a reflective layer, a material included in a cavity, and a thickness of the cavity. The filter may be implemented through grating, a nanostructure, a distributed Bragg reflector (DBR), or other methods.

The processor 500 may be configured to control general operations of the image acquisition apparatus 10. The processor 500 may include a single core or multiple cores. The processor 500 may be configured to process or execute programs and/or data stored in a memory. For example, the processor 500 may be configured to control functions of the image acquisition apparatus 10 by executing the programs stored in the memory.

The processor 500 according to an embodiment may be configured to acquire channel signals corresponding to four or more channels from the multispectral image sensor 100. The processor 500 may be configured to select at least some of a preset number of channels physically provided in the multispectral image sensor 100 and acquire channel signals from the selected channels. For example, the processor 500 may be configured to acquire the channel signals from all of the preset number of channels physically provided in the multispectral image sensor 100. In addition, the processor 500 may also be configured to select only some of the preset number of channels physically provided in the multispectral image sensor 100 and acquire channel signals.

The processor 500 may be configured to acquire channel signals more or less than the preset number by synthesizing or interpolating channel signals acquired from the preset number of channels physically provided in the multispectral image sensor 100. For example, the processor 500 may be configured to acquire channel signals less than the preset number of channels by performing binning on pixels or channels of the multispectral image sensor 100. In addition, the processor 500 may also be configured to acquire channel signals more than the preset number of channels by generating new channel signals through interpolation of the channel signals.

When the number of acquired channel signals decreases, each of the channel signals may encompass a wider band, and the signal may have increased sensitivity and reduced noise. On the contrary, when the number of acquired channel signals increases, sensitivity of each of the channel signals may decrease, but more accurate images may be acquired based on collective input from a plurality of channel signals. Like this, due to trade off according to increase and decrease in the number of acquired channel signals, the processor 500 may be configured to acquire an appropriate number of channel signals according to application.

The processor 500 according to an embodiment may be configured to perform image processing before or after an image or signal acquired by the multispectral image sensor 100 is stored in the memory. The image processing performed by the processor 500 may include bad pixel correction, fixed pattern noise correction, crosstalk reduction, remosaicing, demosaicing, false color reduction, denoising, chromatic aberration correction, and the like. However, the disclosure is not limited thereto, and the image processing performed by the processor 500 may further include lens shading correction.

The processor 500 according to an embodiment may be configured to acquire information regarding an environment in which the multispectral image sensor 100 captures an image. For example, the processor 500 may be configured to estimate information regarding at least one illumination source present in the environment during the image acquisition of the multispectral image sensor 100, using channel signals corresponding to the plurality of channels of the multispectral image sensor 100.

An RGB image sensor may be configured to sense a wavelength band in a visible ray range through three R, G, and B channels and acquire channel signals corresponding to these three channels. However, considering that the illumination spectrum continuously varies across the visible ray band and is widely distributed, it may be difficult to accurately estimate the information regarding the at least illumination source present in the environment in which the RGB image sensor acquired the image only using information acquired from three channels. In addition, in the case of images with respect to a scene including a simple background or a simple object, data that may be sampled further decreases, and the accuracy of the estimating the illumination source may not be secured.

The multispectral image sensor 100 may be configured to acquire channel signals corresponding to at least four channels. The image acquisition apparatus 10 may be configured to more accurately estimate the information regarding the at least one illumination source that had existed in the environment in which the multispectral image sensor 100 acquired the image, based on the four or more channel signals that have been acquired.

More particularly, when the multispectral image sensor 100 includes eight or more channels with minimal overlap between the channels, the image acquisition apparatus 10 may be configured to estimate information regarding all types of illumination sources available in a peripheral environment, based on the eight or more channel signals that have been acquired. As overlap between channels of the multispectral image sensor 100 decreases, the accuracy of the information regarding the illumination source estimated by the image acquisition apparatus 10 may be improved.

In the disclosure, minimizing overlap between the channels may indicate setting the channels of the multispectral image sensor 100 such that the wavelength bands sensed by the channels do not overlap one another as much as possible. In addition, when the multispectral image sensor 100 includes a channel configured to sense an entire wavelength band, the minimizing of the overlap between the channels may indicate setting other channels except the channel such that wavelength bands sensed by the other channels do not overlap one another as much as possible. For example, overlapping percentages of less than 10% between adjacent channels may be considered as the minimal overlap between adjacent channels, while the precise thresholds for minimal overlap can vary depending on the design and architecture of the multispectral image sensor 100.

The multispectral image sensor 100 may be configured to adjust center wavelengths and bandwidths of light absorbed through the channels such that the channels may sense light in wavelength bands not overlapping one another as much as possible. In an embodiment, wavelength bands sensed by the plurality of channels of the multispectral image sensor 100 may not overlap one another. The channels of the multispectral image sensor 100 may be configured to sense different wavelength bands divided from the entire wavelength band to be sensed by the multispectral image sensor 100. However, the disclosure is not limited thereto. As another example, an area of a wavelength band sensed by at least one channel of the multispectral image sensor 100 may overlap wavelength bands sensed by other channels. Even in this case, the wavelength band sensed by the at least one channel and the wavelength bands sensed by the other channels may be set not to overlap one another as much as possible. For example, the area of the wavelength band sensed by the at least one channel may be 10% or less of an entire area of the wavelength band sensed by the at least one channel. When the multispectral image sensor 100 includes a plurality of channels with minimal overlap between the channels, the channels of the multispectral image sensor 100 may be configured to sense wavelength bands not overlapping one another as much as possible. As the channels sense wavelength bands that do not overlap as much as possible, the multispectral image sensor 100 may be configured to acquire channel signals with respect to the wavelength bands that do not overlap one another as much as possible. In addition, through the plurality of channels with minimal overlap between the channels, the multispectral image sensor 100 may acquire channel signals with respect to a smaller wavelength band. The channels of the multispectral image sensor 100 may be configured to sense a small wavelength band to avoid overlapping one another as much as possible, and the multispectral image sensor 100 may be configured to acquire channel signals with respect to wavelength bands avoiding overlapping one another as much as possible. Information regarding the illumination source, which is estimated by the image acquisition apparatus 10 from the acquired channel signals, may be accurate.

More particularly, through the multispectral image sensor 100 including the eight or more channels with minimal overlap between the channels, the image acquisition 10 may accurately estimate information regarding all types of illumination sources available in the peripheral environment.

The processor 500 according to an embodiment may be configured to perform various types of correction on the image acquired from the multispectral image sensor 100. For example, the processor 500 may be configured to perform color calibration, lens shading correction, white balance correction, or the like, on the image acquired from the multispectral image sensor 100.

The processor 500 may be configured to perform various types of correction mentioned above on the image acquired using information regarding at least one illumination source estimated by the multispectral image sensor 100. In related art, lens shading correction and the like have been performed on images acquired based on color temperature. However, even illumination sources having a same color temperature may have different spectral characteristics. Accordingly, the image on which lens shading correction has been performed only based on the color temperature may be insufficient to accurately express an actual and distinct color of an object or a background included in the image.

The multispectral image sensor 100 including the eight or more channels with minimal overlap between the channels may be configured to acquire eight or more channel signals, and the processor 500 may be configured to accurately estimate the information regarding the at least one illumination source existing in the environment in which the multispectral image sensor 100 acquires the image, based on the signals of the eight or more channels with minimal overlap between the channels. The processor 500 may be configured to perform lens shading correction on the image acquired by the multispectral image sensor 100, based on the information regarding the at least one illumination source that has been accurately estimated. The image on which lens shading correction has been performed may accurately express the actual and distinct color of the object or the background included in the image.

The image acquisition apparatus 10 may further include the memory. The memory may be configured to store the image acquired from the multispectral image sensor 100. The memory may include a line memory configured to consecutively store images in line unit, and may also include a frame buffer configured to store an entire image. In addition, the memory may be configured to store applications and drivers to be driven by the image acquisition apparatus 10.

The memory may include random access memory (RAM) such as dynamic random access memory (DRAM), static random access memory (SRAM), and the like, read-only memory (ROM), electrically erasable programmable read-only memory (EEPROM), CD-ROM, Blu-ray or other optical disk storages, hard disk drive (HDD), solid state drive (SSD), or a flash memory. However, the disclosure is not limited thereto.

The memory may be configured to store information required for performance of correction on the image acquired from the multispectral image sensor 100. For example, the memory may be configured to store information required for performance of lens shading correction on an image captured in an environment in which a specific illumination source exists.

The memory may be outside the multispectral image sensor 100 or may be integrated in the multispectral image sensor 100. When the memory is integrated in the multispectral image sensor 100, the memory may be integrated together with a circuitry (e.g., the wiring layer 51 and/or the driving circuit 52 shown in FIG. 1). A pixel unit (e.g., the semiconductor substrate 61 and/or the photodiode 62 shown in FIG. 1) and other parts (e.g., the circuitry and the memory) may each correspond to a stack and may be integrated into two stacks. In this case, the multispectral image sensor 100 may include a chip including two stacks. However, the embodiment is not limited thereto, and the multispectral image sensor 100 may be implemented as three stacks including three layers of the pixel unit, the circuitry, and the memory.

Figure 2B:
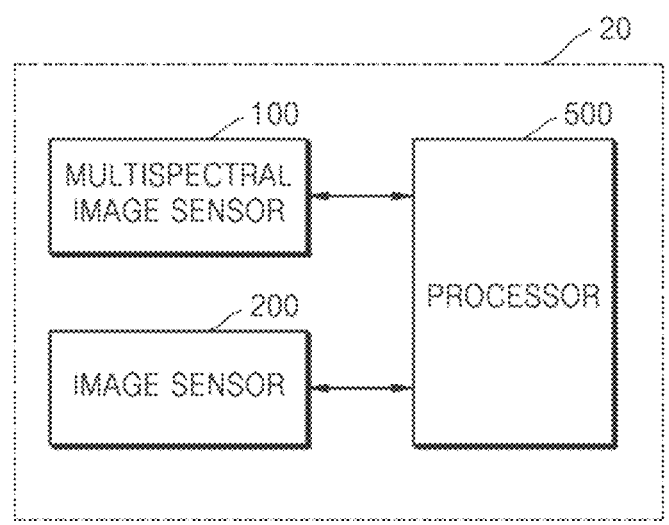
FIG. 2B is a block diagram illustrating a structure of an image acquisition apparatus according to another embodiment.

FIG. 2B is a block diagram illustrating a structure of an image acquisition apparatus 20 according to another embodiment.

Referring to FIG. 2B, the image acquisition apparatus 20 according to another embodiment may include the multispectral image sensor 100, an image sensor 200, and the processor 500. Compared with the image acquisition apparatus 10 shown in FIG. 2A, the image acquisition apparatus 20 according to the other embodiment may further include the image sensor 200. As the multispectral image sensor 100 shown in FIG. 2B is substantially identical to the multispectral image sensor 100 shown in FIG. 2A, same descriptions thereof will be omitted.

The multispectral image sensor 100 may be configured to acquire a first image of a first wavelength band, and the image sensor 200 may be configured to acquire a second image of a second wavelength band. The first wavelength band may include the second wavelength band and may be greater than the second wavelength band. However, the embodiments are not limited thereto, and the second wavelength band may include the first wavelength band and may be greater than the first wavelength band. In addition, the first wavelength band and the second wavelength band may be substantially identical to each other. The image sensor 200 may have a less number of channels than the number of channels of the multispectral image sensor 100. For example, the image sensor 200 may include less than four channels to acquire an image of at least one object in an environment in which at least one illumination source exists.

The image sensor 200 according to an embodiment may include an RGB image sensor and may be referred to as a panchromatic image sensor. The RGB image sensor may include an R channel, a G channel, and a B channel to create a full-color image. The image sensor 200, which is a sensor used in general RGB cameras, may include a CMOS image sensor in which a Bayer filter array is used. The second image acquired by the image sensor 200 may include an RGB image based on red, green, and blue colors. The image sensor 200 may be sensitive to a broad range of wavelengths within a visible light spectrum (approximately 400-700 nanometers) while the multispectral image sensor 100 may be sensitive to specific, predetermined spectral bands within the visible light spectrum or beyond the visible light spectrum such as ultraviolet (UV) and infrared (IR) wavelengths. The multispectral image sensor 100 may capture data in multiple spectral bands, which can vary from a few bands to several dozen or more, depending on a specific application. Each channel in the multispectral image sensor 100 may have a narrow wavelength range compared to each of the R, G, B channels in the image sensor 200, but the entire spectrum covered by the multispectral image sensor 100 may have a broader range of wavelengths than that covered by the image sensor 200.

The image sensor 200 according to the other embodiment may include a monochrome image sensor. The monochrome image sensor includes a color channel. The second image acquired by the image sensor 200 may include a monochrome image.

The multispectral image sensor 100 may include a sensor configured to sense light of more various types of wavelength compared with the image sensor 200. Each channel of the multispectral image sensor 100 may be configured to adjust a wavelength in which light is transmitted, an amount of transmission, and a bandwidth of the light such that light in a desired band is sensed. A bandwidth of each channel of the multispectral image sensor 100 may be set less than bandwidths of an R band, a G band, and a B band. The multispectral image sensor 100 may adjust the bandwidth of each channel to avoid overlapping as much as possible.

Figure 3:
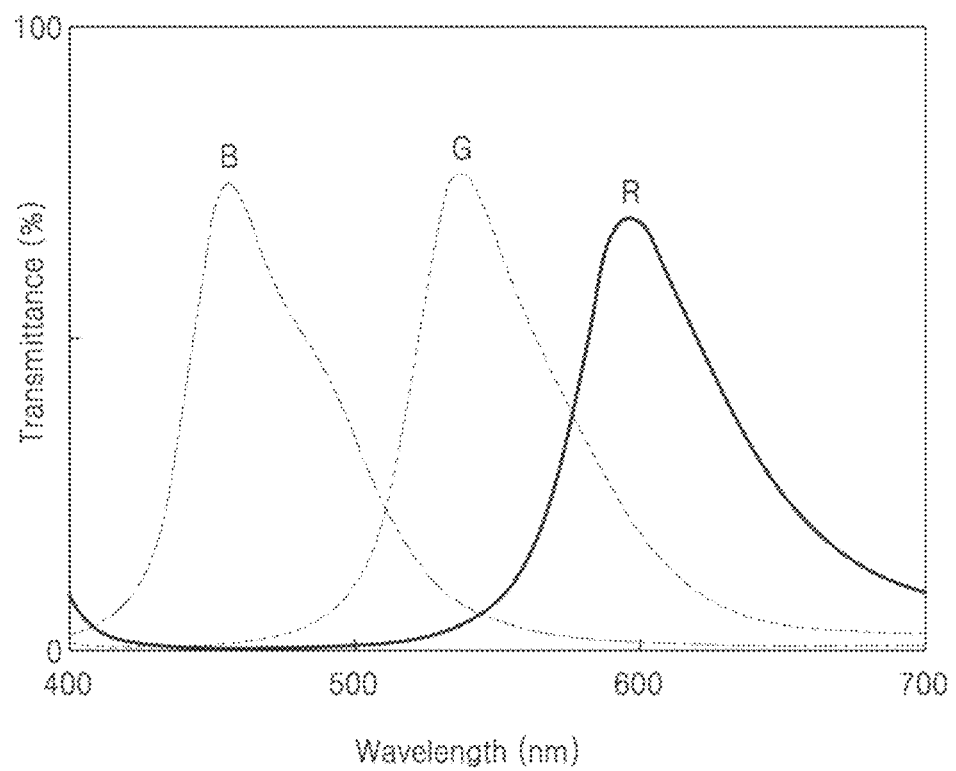
FIG. 3 is a diagram of a wavelength spectrum of an RGB image sensor.

FIG. 3 is a diagram of a wavelength spectrum of the RGB image sensor.

Referring to FIG. 3, an image sensor (e.g., the image sensor 200 shown in FIG. 2B) may include an R channel, a G channel, and B channel, and may be configured to sense light of a wavelength band corresponding to each of the aforementioned three channels.

Figure 4A:
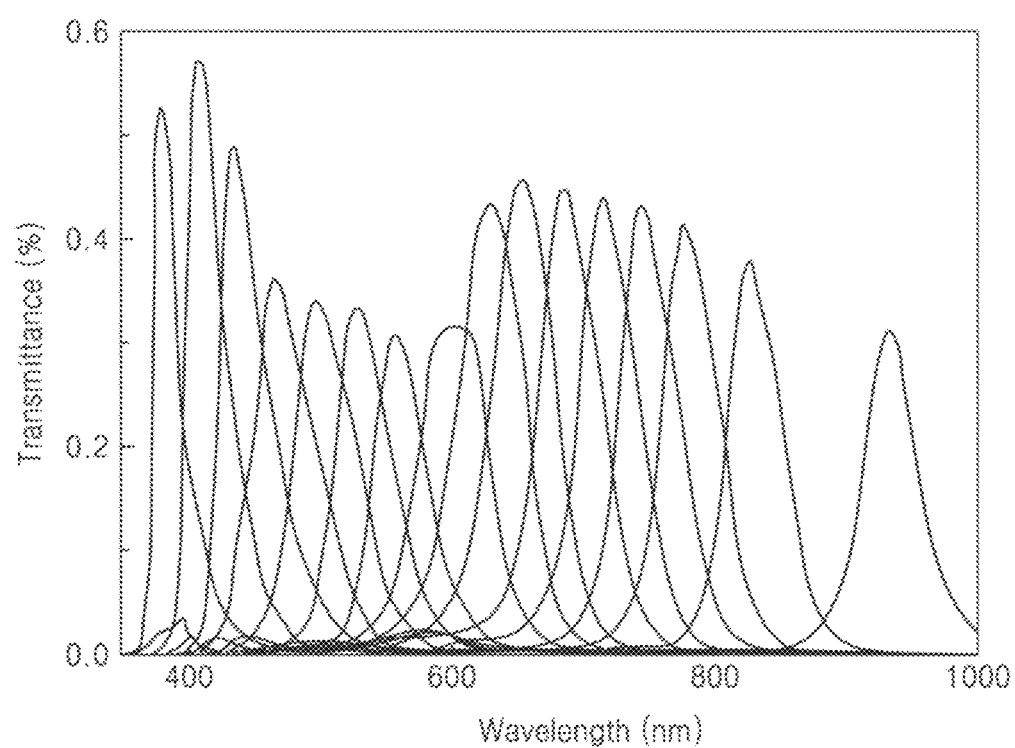
FIG. 4A is a diagram of a wavelength spectrum of a multispectral image sensor according to an embodiment.
Figure 4B:
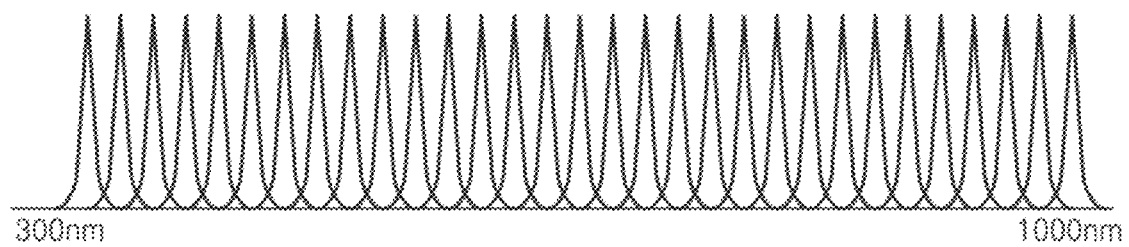
FIG. 4B is a diagram of a wavelength spectrum of a multispectral image sensor according to an embodiment.

FIG. 4A is a diagram of a wavelength spectrum of the multispectral image sensor 100 according to an embodiment, and FIG. 4B is a diagram of a wavelength spectrum of the multispectral image sensor 100 according to another embodiment.

Referring to FIGS. 4A and 4B, the multispectral image sensor 100 may include sixteen channels or thirty-one channels. However, the disclosure is not limited thereto, and the multispectral image sensor 100 may include an arbitrary number of channels, e.g., four or more.

The multispectral image sensor 100 may be configured to sense light of wavelength bands corresponding to a plurality of channels. Wavelength bands corresponding to the plurality of channels may be determined by dividing an entire band, which is sensed by the multispectral image sensor 100, at uniform intervals. However, the disclosure is not limited thereto, and wavelength bands of some of the plurality of channels may be greater or less than wavelength bands of others of the plurality of channels. In addition, wavelength bands of some of the plurality of channels may include the entire band sensed by the multispectral image sensor 100.

The multispectral image sensor 100 may include a pixel array, and the pixel array will be described below with reference to FIG. 5.

Figure 5:
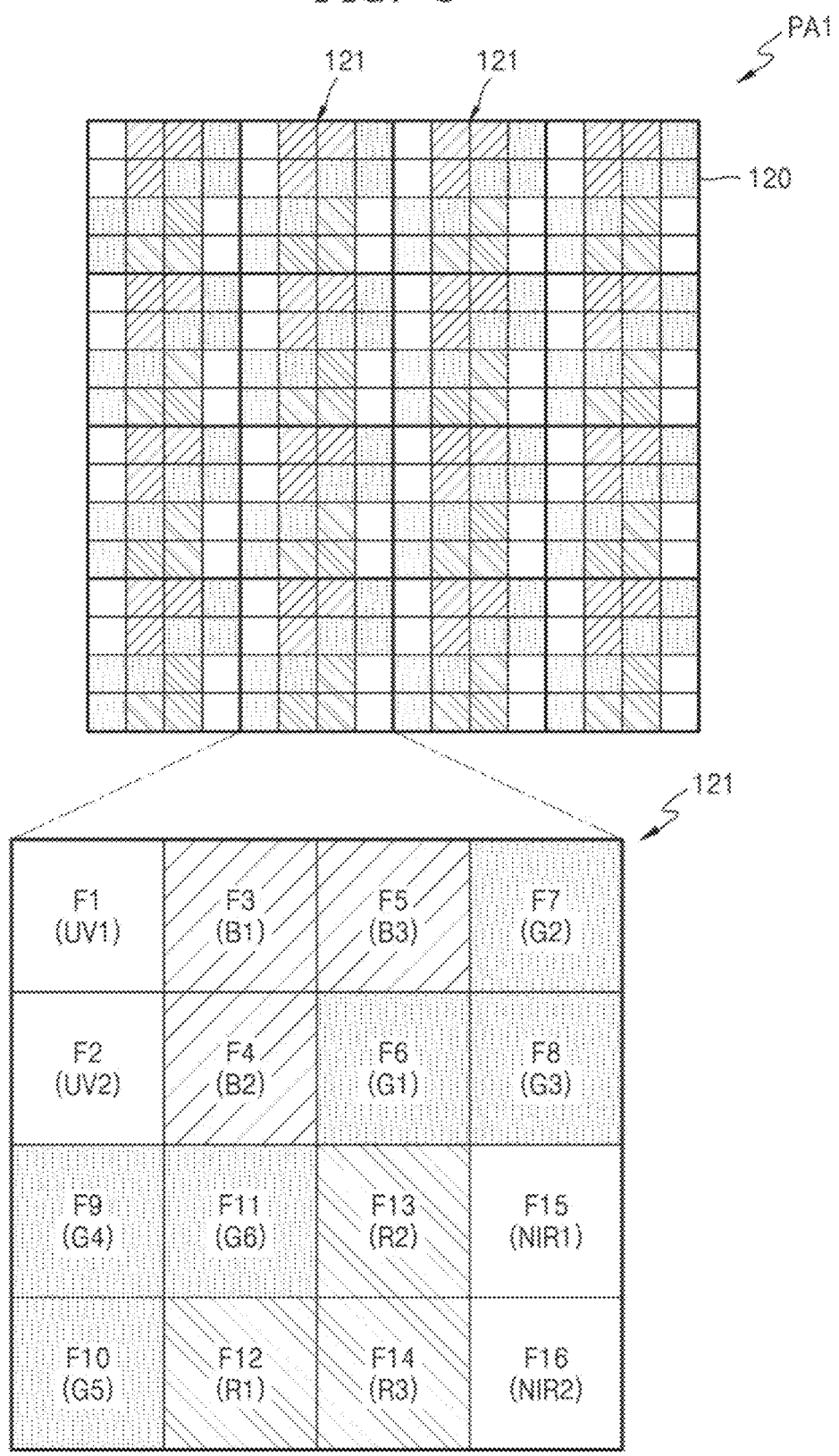
FIG. 5 is a diagram of a pixel arrangement in a multispectral image sensor according to an embodiment.

FIG. 5 is a diagram of a pixel arrangement in the multispectral image sensor according to an embodiment.

Referring to FIG. 5, a spectral filter 120 provided in a pixel array PA1 may include a plurality of filter groups 121 being two-dimensionally arranged. Here, each of the plurality of filter groups 121 may include sixteen unit filters F1 to F16 arranged in the form of a 4×4 array. However, the disclosure is not limited thereto. For example, each of the filter groups 121 may include nine unit filters F1 to F9 arranged in the form of a 3×3 array, twenty-five unit filters F1 to F25 arranged in the form of a 5×5 array, or M×N unit filters arranged in the form of an M×N array (where each of M and N indicates an arbitrary integer of 1 or more).

For example, when each of the plurality of filter groups 121 is arranged in the form of the 4×4 array, the first unit filter F1 and the second unit filter F2 may have center wavelengths UV1 and UV2 in an ultraviolet range, and the third unit filter F3, the fourth unit filter F3, and the fifth unit filter F5 may have center wavelengths B1, B2, and B3 in a blue light range. The sixth unit filter F6, the seventh unit filter F7, the eighth unit filter F8, the ninth unit filter F9, the tenth unit filter F10, and the eleventh unit filter F11 may have center wavelengths G1 to G6, and the twelfth unit filter F12, the thirteenth unit filter F13, and the fourteenth unit filter F14 may have center wavelengths R1 to R3 in a red light range. The fifteenth unit filter F15 and the sixteenth filter F16 may have center wavelengths NIR1 and NIR2 in a near-infrared range.

For another example, when each of the plurality of filter groups 121 is arranged in the form of the 3×3 array, a first unit filter F1 and a second unit filter F2 may have center wavelengths UV1 and UV2 in the ultraviolet range, and a fourth unit filter F4, a fifth unit filter F5, and a seventh unit filter F7 may have center wavelengths B1 to B3 in the blue light range. A third unit filter F3 and a sixth unit filter F6 may have center wavelengths G1 and G2 in a green light range, and an eighth unit filter F8 and a ninth unit filter F9 may have center wavelengths R1 and R2 in a red light range.

For another example, when each of the plurality of filter groups 121 is arranged in the form of the 5×5 array, a first unit filter F1, a second unit filter F2, and a third unit filter F3 may have center wavelengths UV1 to UV3 in the ultraviolet range, and a sixth unit filter F6, a seventh unit filter F7, an eighth unit filter F8, an eleventh unit filter F11, and a twelfth unit filter F12 may have center wavelengths B1 to B5 in the blue light range. A fourth unit filter F4, a fifth unit filter F5, and a ninth unit filter F9 may have center wavelengths G1 to G3 in the green light range, and a tenth unit filter F10, a thirteenth unit filter F13, a fourteenth unit filter F14, a fifteenth unit filter F15, an eighteenth unit filter F18, and a nineteenth unit filter F19 may have center wavelengths R1 to R6 in the red light range. A twentieth unit filter F20, a twenty-third unit filter F23, a twenty-fourth unit filter F24, and a twenty-fifth unit filter F25 may have center wavelengths NIR1 to NIR4 in the near-infrared range.

The aforementioned unit filters provided in the spectral filter 120 may have a resonance structure including two reflective plates, and wavelength bands of transmission may be determined according to characteristics of the resonance structure. The transmission wavelength band may be adjusted according to a material of the reflective plate, a material of a dielectric material in a cavity, and a thickness of the cavity. Furthermore, a structure in which grating is used, a structure in which DBR used, and the like may be applied to the unit filters.

Pixels in the pixel array PA1 may also be arranged in various methods according to color characteristics of the multispectral image sensor 100.

Figure 6:
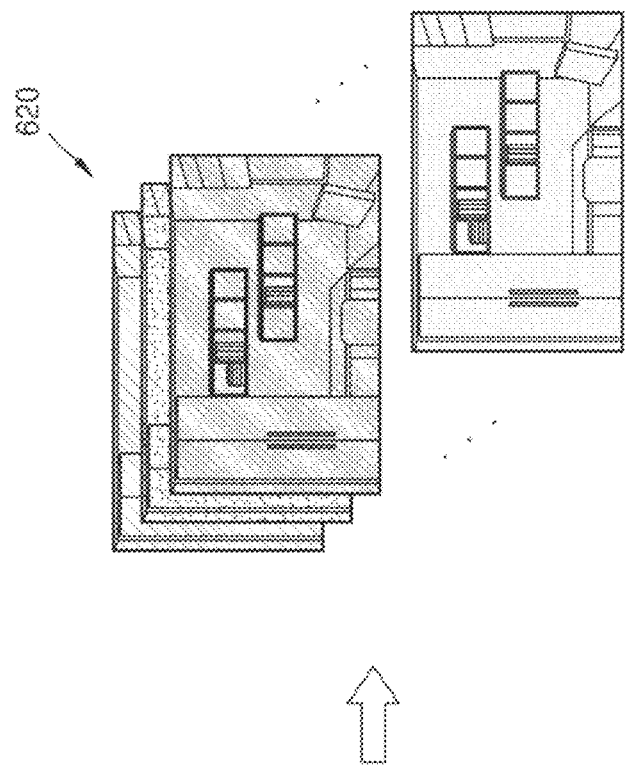
FIG. 6 is a diagram for describing a process of forming images according to channels of a multispectral image sensor according to an embodiment, based on signals acquired from the plurality of channels.
Figure 6:
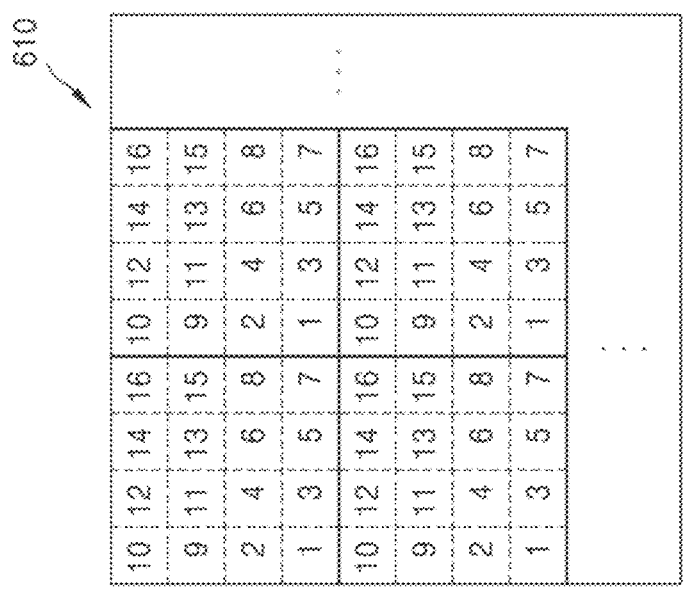

FIG. 6 is a diagram for describing a process of forming images according to the channels of the multispectral image sensor 100 according to an embodiment, based on signals acquired from the plurality of channels.

Referring to FIG. 6, an RAW image 610 acquired from the multispectral image sensor 100 and images for channels 620 after performing demosaic are shown. The term "raw image" may refer to an image captured by an image sensor or a camera module, prior to undergoing any image processing. In the RAW image 610, a small square indicates a pixel, and a number in the square indicates a channel number. According to channel numbers, the RAW image 610 may include an image acquired by a multispectral sensor including sixteen channels. Although the RAW image 610 includes all of pixels corresponding to different channels, as pixels in a same channel are collected through demosaic, the image for channel 620 may be generated.

Figure 7:
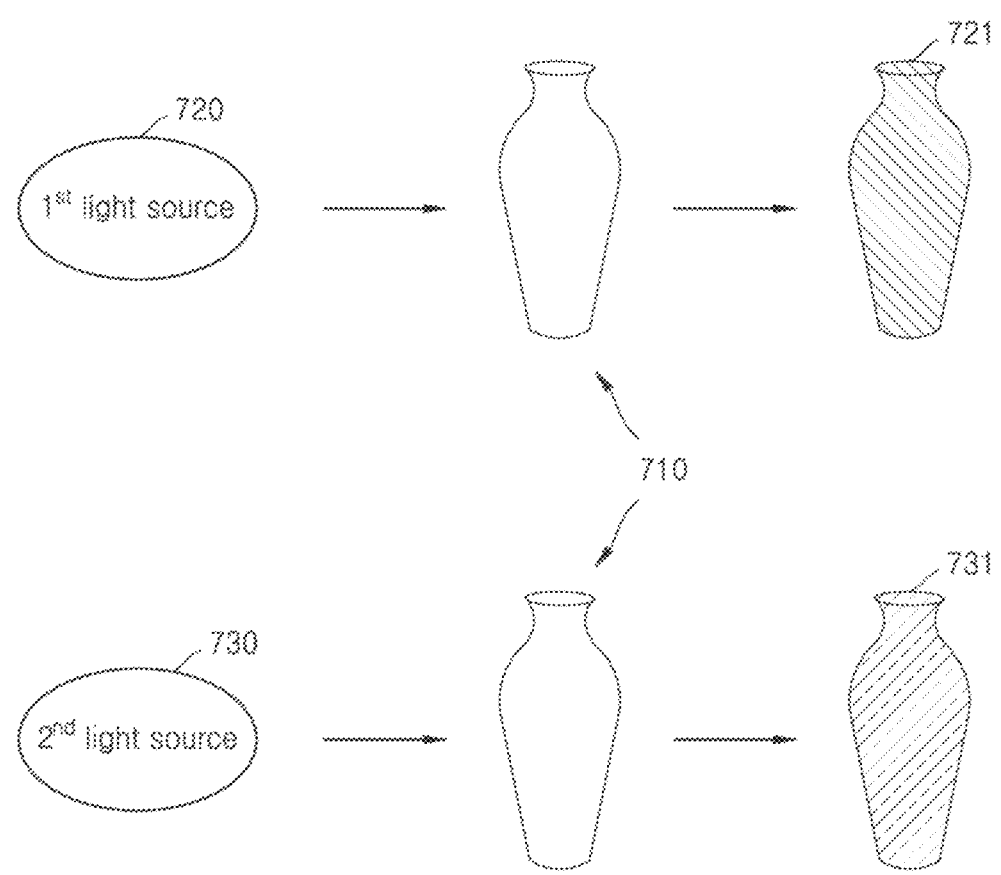
FIG. 7 is a diagram for comparing and describing images acquired for a same object in an environment in which different illumination sources exist, according to embodiments.

FIG. 7 is a diagram for comparing and describing images acquired for a same object in an environment in which different illumination sources exist, according to embodiments.

Referring to FIG. 7, illustrated is a process in which the multispectral image sensor 100 (e.g., the multispectral image sensor 100 shown in FIG. 2A or 2B) acquires images for an object 710 in an environment in which different illumination sources (e.g., a first illumination source 720 and a second illumination source 730) exist. A first image 721 may correspond to an image acquired by capturing the object 710 in the environment in which the first illumination source 720 exists, and a second image 731 may correspond to an image acquired by capturing the object 710 in the environment in which the second illumination source 730 exists.

The color temperature, which expresses a color of an illumination source in a number using an absolute temperature, is related to Planck's law and Wien's displacement law. The color of the illumination source from a black body appears different according to temperatures, and as a wavelength of the illumination source emitted to a maximum degree at a certain temperature is longer, the color temperature is lower. As the color temperature standardizes and designates the color of the illumination source, illumination sources may be distinguished from one another using the color temperature. However, different illumination sources having different spectral characteristics even at a same color temperature may exist. For example, some illumination sources having a same color temperature may have different spectral sensitivities.

The image acquisition apparatus (e.g., the image acquisition apparatus 10 in FIG. 2A and the image acquisition apparatus 20 in FIG. 2B) may be configured to perform lens shading correction based on the illumination spectral data. In the disclosure, the expression "illumination spectral data" may indicate information indicating an environment in which an illumination source exists. For example, the illumination spectral data may include information regarding intensities according to wavelengths of the channel signals acquired from the multispectral sensor. However, the disclosure is not limited thereto, and arbitrary information for distinction of environments in which different illumination sources exist may be referred to as illumination spectral data.

In the disclosure, lens shading correction may indicate performing correction to remove both vignetting and color shading.

The image acquisition apparatus has a round-shaped lens and a flat-shaped multispectral image sensor. Due to the disparity in their shapes, the lens and the multispectral image sensor may have different degrees of bending. The multispectral image sensor is configured to acquire an image by sensing light that passes through the lens, and accordingly, the image acquired by the multispectral image may become darker toward an edge of the image. This is called vignetting.

Color change may occur due to a difference between transmittances of IR cut-filters for an illumination source penetrating a light axis of the lens and an illumination source penetrating a periphery of the light axis. This is called color shading.

In related art, a color temperature of an illumination source has been estimated from an acquired image, and lens shading correction has been performed on an image acquired based on the estimated color temperature. Even the illumination sources having a same color temperature may have different spectral characteristics. However, the image without consideration thereof and on which lens shading correction has been performed based only on the color temperature of the illumination source may not accurately express of an actual and distinct color of the object or background included in the image.

For example, a first illumination source 720 and a second illumination source 730 may include illumination sources having a same color temperature and different spectral characteristics. When lens shading correction is performed based on the color temperature of the first illumination source 720 and the second illumination source 730, the lens shading correction may result in a difference in the color rendering between a first image 721 and a second image 731.

Accordingly, the image acquisition apparatus may be configured to estimate accurate illumination spectral data from an acquired image and perform lens shading correction based on the estimated illumination spectral data, to thereby implement the color of the first image 721 and the color of the second image 731 as a same color. Hereinafter, a method of estimating accurate illumination spectral data from an image acquired by the image acquisition apparatus will be described.

Figure 8:
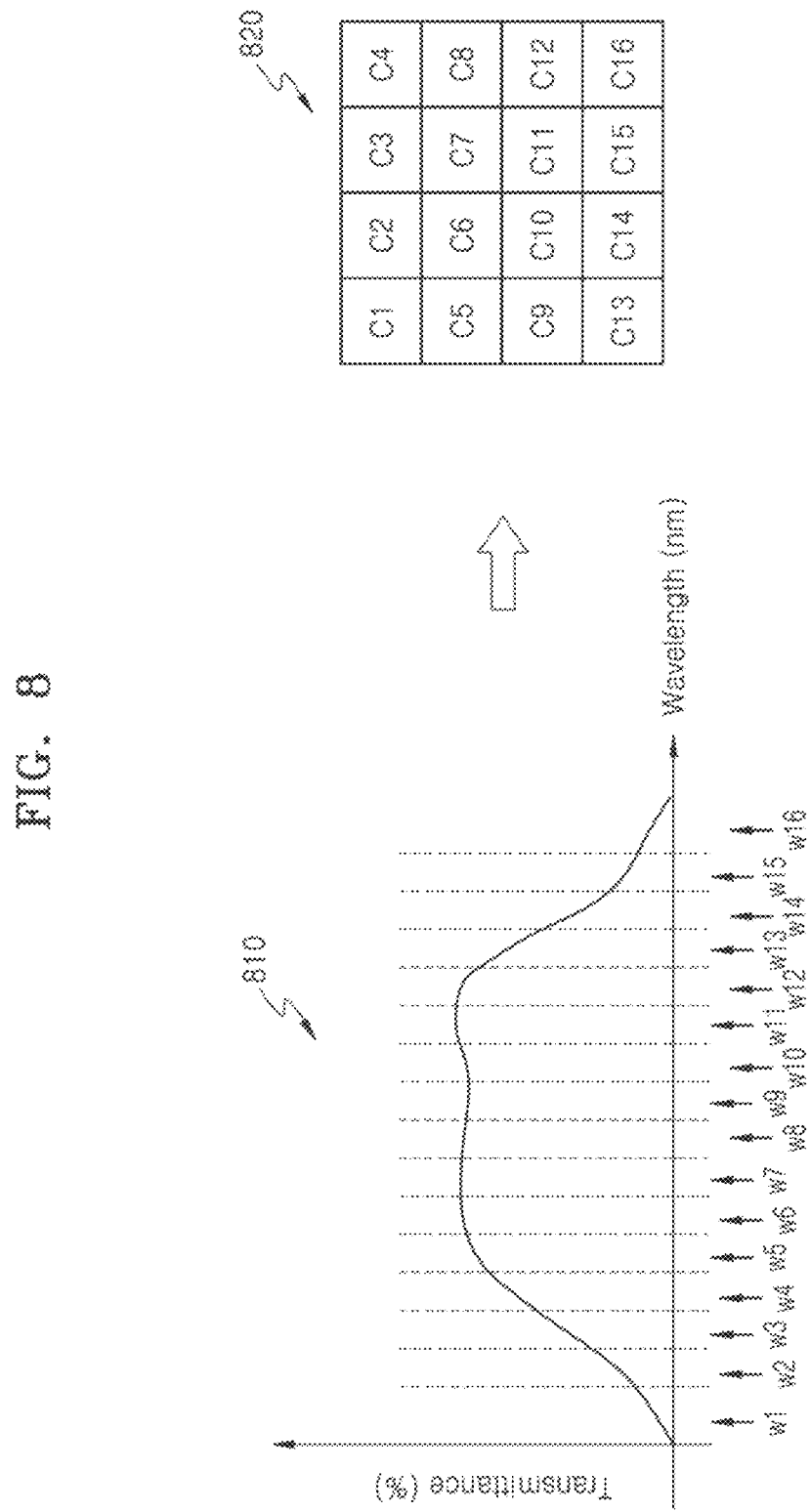
FIG. 8 is a diagram for describing spectrum data acquired based on intensities of signals acquired from a plurality of channels of a multispectral image sensor, according to an embodiment.

FIG. 8 is a diagram for describing spectrum data based intensities of signals acquired from the plurality of channels of the multispectral image sensor according to an embodiment. Referring to FIG. 8, illustrated is an MSFA pattern 820 corresponding to a wavelength spectrum 810 with respect to a particular illumination source, the MSFA pattern 820 estimated by the image acquisition apparatus (e.g., the image acquisition apparatus 10 and the image acquisition apparatus 20 shown in FIGS. 2A and 2B).

The image acquisition apparatus according to an embodiment may be configured to estimate illumination spectral data of an image acquired by the multispectral image sensor using sixteen channel signals corresponding to sixteen or more channels of the multispectral image sensor (e.g., the multispectral image sensor 10 shown in FIG. 2A). The number of channel signals corresponding to the number of channels of the multispectral image sensor is not limited to sixteen, and those skilled in the art may use a sufficient number of channel signals to estimate the illumination spectral data of the image. For example, a multispectral image sensor having eight or more channels with minimal overlap between the channels may be configured to estimate all types of illumination spectral data available in a peripheral environment based on signals of eight channels corresponding to the eight or more channels.

The image acquisition apparatus may acquire intensities of sixteen channel signals corresponding to sixteen or more channels of the multispectral image sensor, with respect to sixteen wavelength bands w1 to w16 divided from the wavelength spectrum 810 for the particular illumination source.

The image acquisition apparatus may be configured to generate the MSFA pattern 820 using the acquired intensities of the channel signals. The MSFA pattern 820 may include sixteen unit color filters C1 to C16 arranged in the form of the 4×4 array. The first unit color filter C1 to the sixteenth unit color filter C16 may be configured to an intensity of a channel signal for a first wavelength band w1 to an intensity of a channel signal for a sixteenth wavelength band w16.

Accordingly, the image acquisition apparatus may be configured to estimate illumination spectral data of the acquired image using spectrum data corresponding to an image acquired with respect to at least one object in an environment in which at least one illumination source exists.

The image acquisition apparatus according to an embodiment may be configured to estimate the illumination spectral data using a linear model from a captured image that is a mixture of illumination spectral data and reflectance) of the object.

$$D_{m \times n} = L_{m \times n} \times R_{m \times n} = L_{m \times n} \times B_{m \times n} \times C_{m \times n} \quad \text{[Equation 1]}$$

In Equation 1, $D_{m \times n}$ is a matrix indicating an image acquired from the multispectral image sensor, $L_{m \times n}$ is a diagonal matrix indicating an illumination source existing when the image is acquired, and $R_{m \times n}$ is a matrix indicating a reflection characteristic of the object. m indicates the number of channels included in the multispectral image sensor, and n indicates the number of pixels in the image acquired from the multispectral image sensor.

$B_{m \times n}$ is a matrix indicating basis vectors related to reflection characteristics of the object, and $C_{m \times n}$ is a matrix indicating a coefficient of the basis vectors related to the reflection characteristics of the object. The reflection characteristics of the object may be expressed through combinations of eight or more basis vectors. s indicates the number of dimensions of a partial space.

The image acquisition apparatus may be configured to calculate a basis vector related to the reflection characteristics of the object based on Equation 1 using singular value decomposition, and by doing so, the image acquisition apparatus may estimate the illumination spectral data. By calculating the eight or more basis vectors related to the reflection characteristics of the object, the image acquisition apparatus may estimate all types of illumination spectral data available in the peripheral environment.

The image acquisition apparatus according to another embodiment may be configured to estimate illumination spectral data using a neural network. The image acquisition apparatus may be configured to estimate the illumination spectral data using a pre-trained machine learning model.

The pre-trained machine learning model with respect to the illumination spectral data may include a machine learning model which has been trained to receive channel signals corresponding to the plurality of channels of the multispectral image sensor and output the illumination spectral data. However, the machine learning model is not limited thereto, and may also include a machine learning model trained to simultaneously receive the channel signals corresponding to the plurality of channels of the multispectral image sensor and channel signals corresponding to less than four channels of the image sensor (e.g., the image sensor 200 shown in FIG. 2B) and output the illumination spectral data.

The image acquisition apparatus may be configured to estimate the illumination spectral data using a shallow neural network. A swallow neural network may be a neural network model that includes an input layer, a hidden layer, and an output layer, and the nodes of the hidden layer and the nodes of the output layer are all connected. The Swallow Neural Network can estimate output data probabilistically by assigning different expected values to a plurality of input data. The image acquisition apparatus may be configured to generate a plurality of images having a thumbnail size (640×480) from the RAW image and estimate illumination spectral data for each of the plurality of images that have been generated. The image acquisition apparatus may be configured to perform white balance correction with respect to each of the plurality of images using white balance coefficients corresponding to different pieces of illumination spectral data. For example, the image acquisition apparatus may be configured to estimate the illumination spectral data by giving a high expectation value to an image having a best white balance among the plurality of images on which white balance correction has been performed.

However, spectrum data usable for estimating an environment in which at least one illumination source exists is only an example of illumination spectral data, and illumination spectral data according to another example may include an index indicating color vector of the illumination source in a color space, a color temperature of the illumination source, or a predetermined illumination type corresponding to the illumination source.

The image acquisition apparatus according to an embodiment may divide the image acquired from the multispectral image sensor into a plurality of areas, and may estimate illumination spectral data for each of the plurality of areas. However, the disclosure is not limited thereto, and the image acquisition apparatus may be configured to directly estimate illumination spectral data for each pixel of the image that has been acquired.

According to an example, each of the plurality of areas may be divided based on a distance from the image acquisition apparatus to the object (or a depth of the object in a frame of the image that has been acquired). However, the disclosure is not limited thereto. According to another example, each of the plurality of areas may be divided using object detection and/or image segmentation. In addition, each of the plurality of areas that have been segmented may be segmented in a same size and a same shape. For example, each of the plurality of areas that have been segmented may be segmented in square-block unit having a same size and a same shape. However, the disclosure is not limited thereto. For another example, each of the plurality of areas that have been segmented may be segmented in polygon-block unit having non-uniform sizes and non-uniform shapes.

The image acquisition apparatus according to an embodiment may be configured to perform pre-processing before estimating the illumination spectral data. For example, image processing performed by the image acquisition apparatus before estimating the illumination spectral data may include bad pixel correction, fixed pattern noise correction, crosstalk reduction, remosaicing, demosaicing, false color reduction, denoising, chromatic aberration correction, and the like. For another example, the image acquisition apparatus may also be configured to perform lens shading correction before estimating the illumination spectral data. In this case, the lens shading correction may be performed without using illumination spectral data, or may be performed using illumination spectral data estimated based on a previously acquired image. However, image processing performed by the image acquisition apparatus is not limited to the aforementioned examples. The image processing described above may also be performed after the image acquisition process estimates the illumination spectral data.

Figure 9:
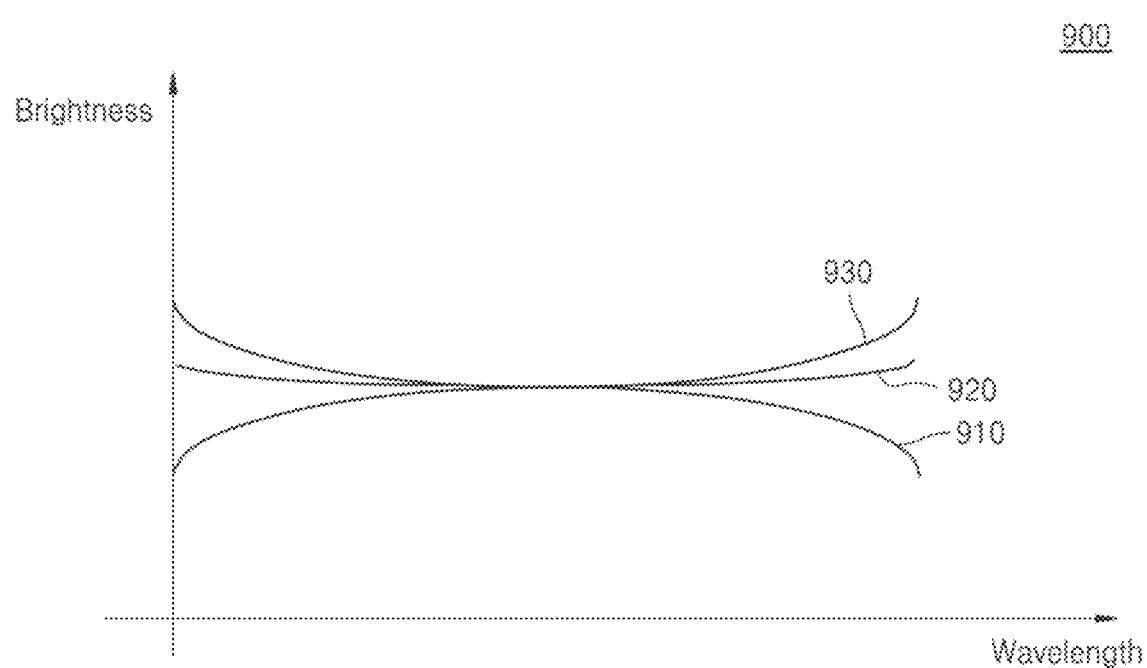
FIG. 9 is a diagram for describing a method of lens shading correction performed in the related art.

FIG. 9 is a diagram for describing a method of lens shading correction performed in related art. Referring to FIG. 9, a brightness curve graph 900 of an image shows a first brightness curve 910 of an image before performing lens shading correction according to an embodiment, a second brightness curve 920 of the image before performing lens shading correction, and a corrected curve 930 reversed from the first brightness curve 910. An x axis of the brightness curve graph 900 of indicates a pixel position, and a y axis indicates a brightness normalized such that a maximum brightness of the first brightness curve 910 is 1.

$$G = 1 - a(p-c)^2 \quad \text{[Equation 2]}$$

$$G = 1 + a(p-c)^2 \quad \text{[Equation 3]}$$

In Equations 2 and 3, G indicates luminance, p indicates pixel positions, c indicates positions of a center pixel, and a indicates a coefficient related to lens shading correction. The first brightness curve 910 may be approximated in the form of a curve expressed by Equation 2, and the corrected curve 930 may be approximated in the form of a curve expressed by Equation 3.

Lens shading correction may be performed on the image by straightening the first brightness curve 910 in the form of the second brightness curve 920 using the corrected curve 930. However, in the lens shading correction described above, an illumination source existing in an environment in which the image has been captured may be not considered. Hereinafter, a method of performing lens shading correction on an image in consideration of the environment in which the illumination source exists will be described.

Figure 10:
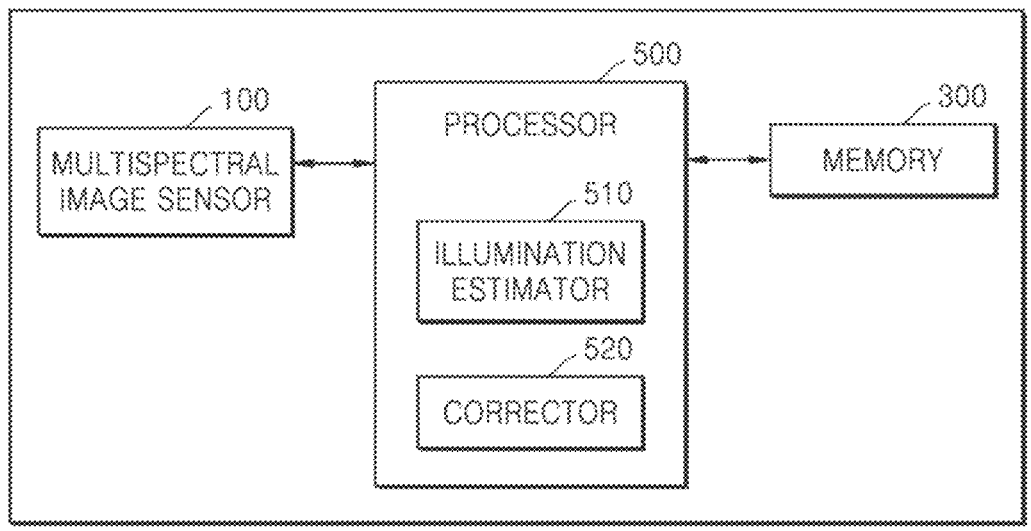
FIG. 10 is a detailed block diagram of the image acquisition apparatus shown in FIG. 2A.

FIG. 10 is a detailed block diagram of the image acquisition apparatus 10 shown in FIG. 2A.

Referring to FIG. 10, in addition to the multispectral image sensor 100 and the processor 500, the image acquisition apparatus 10 may further include a memory 300. In addition, the processor 500 may also include an illumination estimator 510 and a corrector 520. Although the illumination estimator 510 and the corrector 520 have been distinguished from each other according to operations of the processor 500 for convenience of explanation, such distinction does not indicate that the aforementioned units are necessarily physically separated from each other. The aforementioned units may correspond to an arbitrary combination of hardware and/or software included in the processor 500, and may be physically identical to or different from each other.

The multispectral image sensor 100 may include a sensor in which color calibration has been performed on one or more illumination sources. By the color space conversion matrix, the channel signals corresponding to the channels of the multispectral image sensor 100 may be converted to an XYZ signal of an XYZ color space. The XYZ signal in the XYZ color space may be independent to spectral sensitivity of the multispectral image sensor 100 and subject to spectral sensitivity recognized by human eyes.

The processor 500 may be configured to perform lens shading correction with respect to the acquired images based on the estimated illumination spectral data. In addition, the processor 500 may be configured to perform white balance correction with respect to the image on which lens shading has been performed, based on the estimated illumination spectral data. The method of performing white balance correction will be described later with reference to FIG. 14.

A correction table corresponding to the illumination spectral data may be stored in the memory 300. The correction table may include correction data with respect to each of the plurality of channels of the multispectral image sensor 100. The image acquired from the multispectral image sensor 100 may include a plurality of segmented areas, and the correction table may include correction data corresponding to a corner of a grid of each of the plurality of segmented areas. The grid may segment each of the plurality of areas into uniform or non-uniform areas.

Correction data for performing lens shading correction using a scale factor and/or an offset corresponding to the estimated illumination spectral data may be stored in the memory 300.

$$E_{out} = s_i E_{in} \quad \text{[Equation 4]}$$

$$E_{out} = s_i E_{in} + o_i \quad \text{[Equation 5]}$$

In Equations 4 and 5, $E_{in}$ indicates input data related to the image acquired from the multispectral image sensor 100, and $E_{out}$ indicates output data related to the image on which lens shading correction has been performed. Subscript i indicates an index indicating the estimated illumination spectral data, $s_i$ indicates a normalization factor corresponding to the estimated illumination spectral data, and $o_i$ indicates a deviation corresponding to the estimated illumination spectral data.

The input data related to the image acquired from the multispectral image sensor 100 ($E_{in}$) may indicate intensities of channel signals corresponding to the plurality of channels of the multispectral image sensor 100. The processor 500 may be configured to perform lens shading correction with respect to the acquired image by inputting the input data ($E_{in}$) to Equation 4 and/or Equation 5 and output the output data ($E_{out}$) related to the image on which lens shading correction has been performed.

Correction data for performing lens shading correction using an incidence angle corresponding to the estimated illumination spectral data may be further stored in the memory 300.

$$E_{out} = s_i E_{in} \cos^4 \theta_i \quad \text{[Equation 6]}$$

In Equation 6, $\theta_i$ indicates an incidence angle of an illumination source corresponding to the estimated illumination spectral data.

The input image ($E_{in}$) related to the image acquired from the multispectral image sensor 100 may indicate an intensity of the channel signal corresponding to each of the channels of the multispectral image sensor 100, and the processor 500 may be configured to perform lens shading correction with respect to the acquired image by inputting the input data ($E_{in}$) to Equation 6 and outputting the output data ($E_{out}$) related to the image on which lens shading correction has been performed. For example, after estimating illumination spectral data, the multispectral image sensor 100 may receive an angle of incidence and/or a scale factor corresponding to the estimated illumination data from memory. The multispectral image sensor 100 may perform lens shading correction using the estimated illumination spectral data, the incident angle and/or scale factor received from the memory, and Equation 6.

The memory 300 according to another embodiment may further store correction data for performing lens shading correction using a curve fitting coefficient corresponding to the estimated illumination spectral data, in addition to the correction data for performing lens shading correction using the scale factor and/or the offset corresponding to the estimated illumination spectral data. The scale factor may be also referred to as a gain coefficient or a scaling coefficient, and may be used as a multiplicative factor to adjust the amplitude or intensity of pixel values in an image. The offset may be used as an additive value to shift pixel values up or down, and thereby to change the baseline level of intensity in the image.

However, the correction data stored in the memory 300 is not limited to the aforementioned embodiments. A memory according to another embodiment may store correction data including an appropriate combination of a scale factor, an offset, an incidence angle, and/or a curve fitting coefficient corresponding to the estimated illumination spectral data. The incidence angle may refer to an angle at which light reach the multispectral image sensor 100. The curve fitting coefficient may refer to a gamma correction coefficient for adjusting brightness and contrast of an image, or a color correction coefficient to achieve color balance.

The processor 500 may be configured to receive, from the memory 300, a correction table corresponding to the illumination spectral data that has been estimated, and may also be configured to perform lens shading correction with respect to the image acquired from the multispectral image sensor 100 using the received correction table. Due to limitation in a storage space of the memory 300, the memory 300 may not store correction tables corresponding to all of illumination spectral data. Hereinafter, a method of acquiring a correction table that has not been previously stored in the memory 300 will be described with reference to FIG. 11.

Figure 11:
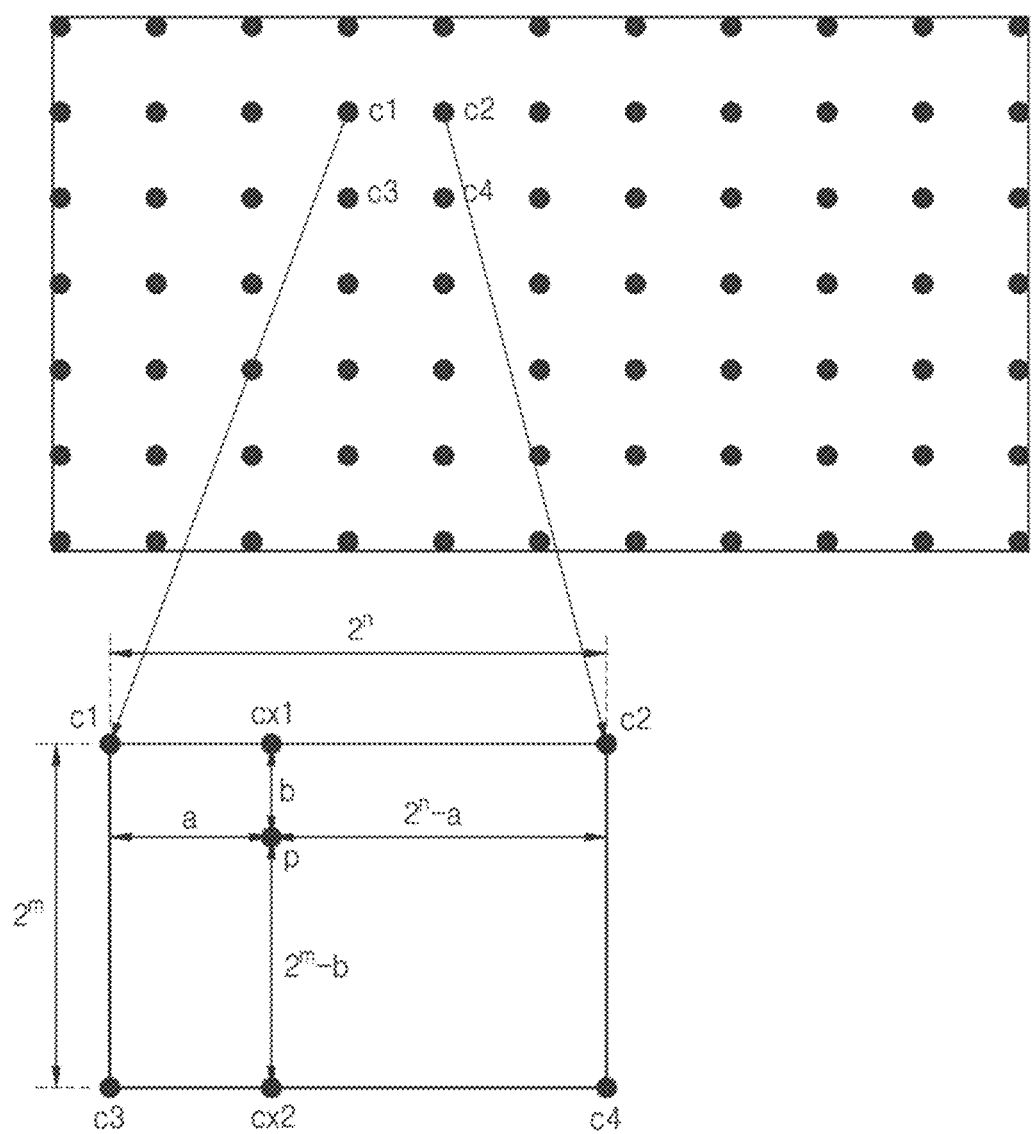
FIG. 11 is a diagram for describing an interpolation method according to an embodiment.
Figure 12:
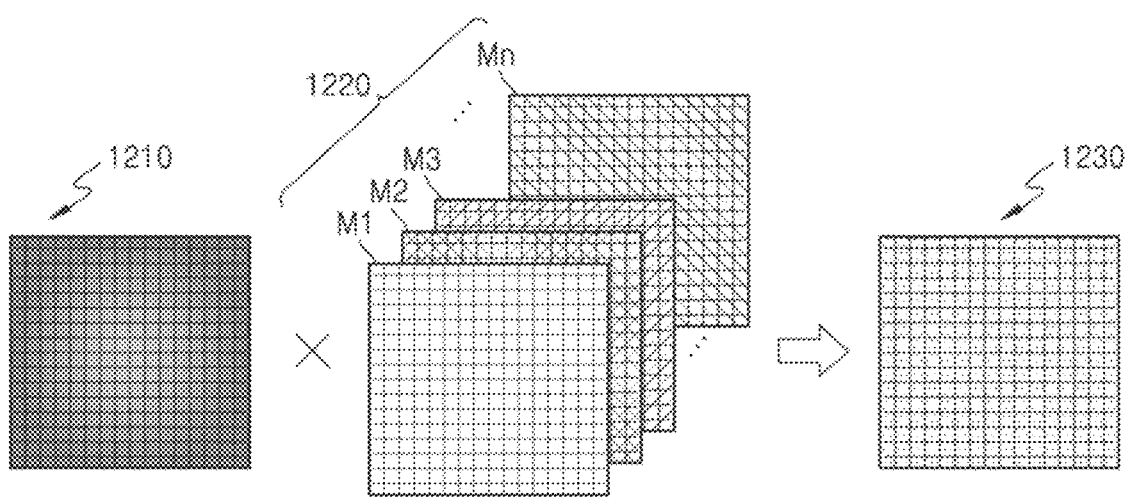
FIG. 12 is a diagram for describing a process of generating a correction map, according to an embodiment.

FIG. 11 is a diagram for describing an interpolation method according to an embodiment, and FIG. 12 is a diagram for describing a method of generating a correction map according to an embodiment.

A processor (e.g., the processor 500 shown in FIG. 2A, 2B, or 10) may be configured to generate a correction map by performing linear interpolation with respect to the correction table corresponding to the estimated illumination spectral data. The processor may be configured to perform lens shading correction with respect to each of the channels of the multispectral image sensor (e.g., the multispectral image sensor 100 shown in FIG. 2A, 2B, or 10).

Referring to FIG. 11, an area 1100 segmented in block unit from among the images acquired from the multispectral image sensor is shown. A memory (e.g., the memory 300 shown in FIGS. 2A, 2B, and 10) may store only correction data corresponding to corners (corners c1, c2, c3, c4, and the like) of the grid uniformly dividing the area 1100, but the processor may be configured to acquire correction data corresponding to an arbitrary coordinate (e.g. a coordinate p) among the corners (i.e., the corners c1, c2, c3, and c4) of the grid by performing linear interpolation with respect to limited correction data stored in the memory.

$$cx1 = c1 + (c2 - c1) \times a \gg n \quad \text{[Equation 7]}$$
$$cx2 = c3 + (c4 - c3) \times a \gg n$$
$$p = c1 + (cx2 - cx1) \times b \gg m$$

In Equation 7, p indicates an arbitrary coordinate among the corners of the grid, indicates an arbitrary coordinate at which p and an x-axis coordinate are consistent, between a first corner c1 and a second corner c2, indicates an arbitrary coordinate at which p and an x-axis coordinate are consistent, between a third corner c3 and a fourth corner c4, and n and m indicate integers used to reduce the complexity of calculation. Based on Equation 7, the processor 500 may be configured to acquire correction data corresponding to the arbitrary coordinate p.

The processor 500 may be configured to generate a correction map with respect to each of the channels of the multispectral image sensor 100 by performing linear interpolation with respect to the correction table corresponding to the acquired illumination spectral data.

FIG. 12 illustrates an image of a case in which lens shading correction is performed with respect to the image acquired using the correction map generated in the embodiment shown in FIG. 11.

Referring to FIG. 12, a first image 1210 is an image before performing lens shading correction, and a second image 1230 is an image on which lens shading correction has been performed. By performing lens shading correction on the first image 1210 using a correction map 1220, the image acquisition apparatus (e.g., the image acquisition apparatus 10 shown in FIGS. 2A, 2B, and 10) may acquire the second image 1230.

The correction map 1220 shown in FIG. 12 may include the correction map generated in FIG. 11. The correction map 1220 may include a first correction map M1, a second correction map M2 to an nth correction map Mn for n channels of the multispectral image sensor.

The processor may be configured to perform, using the correction map 1220 that has been generated, lens shading correction with respect to all of the RAW images (e.g., the RAW image 610 image shown in FIG. 6) or the images according to channels (e.g., the images according to the channels 620 shown in FIG. 6) acquired from the multispectral image sensor 100.

Figure 13:
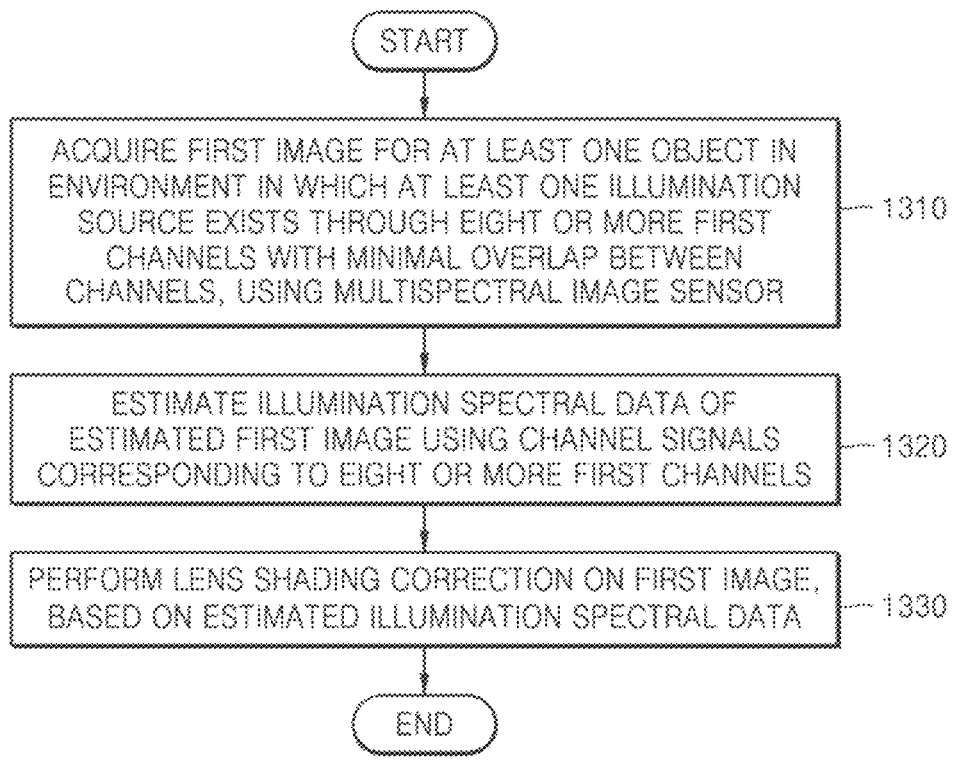
FIG. 13 is a flowchart of a method of performing lens shading correction on an image acquired from a multispectral image sensor, according to an embodiment.

FIG. 13 is a flowchart of a method of performing lens shading correction on an image acquired from a multispectral image sensor 10 according to an embodiment.

The method shown in FIG. 13 may be performed with an image acquisition apparatus (e.g., the image acquisition apparatus 10 shown in FIGS. 2A, 2B, and 10), and descriptions above with reference to FIGS. 1 to 12 may be applied to the method shown in FIG. 13, even though the descriptions are omitted below.

In operation 1310, the image acquisition apparatus may use a multispectral image sensor (e.g., the multispectral image sensor 100 shown in FIG. 10) to acquire the first image for at least one object through eight or more first channels with minimal overlapping between the channels in an environment in which at least one illumination source exists. The multispectral image sensor may include a sensor on which color calibration has been previously performed.

In operation 1320, the image acquisition apparatus may be configured to estimate illumination spectral data of the first image acquired using the channel signals corresponding to the eight or more first channels. The illumination spectral data may include information regarding intensities of the channel signals acquired from the multispectral image sensor according to wavelengths. For example, the image acquisition apparatus may be configured to generate an MSFA pattern (e.g., the MSFA patter 820 shown in FIG. 820) corresponding to the estimated illumination spectral data.

In operation 1330, the image acquisition apparatus may be configured to perform lens shading correction on the first image based on the estimated illumination spectral data. The image acquisition apparatus may be configured to generate a correction map with respect to the eight or more first channels of the multispectral image sensor by performing linear interpolation with respect to the correction table corresponding to the estimated illumination spectral data. The image acquisition apparatus may be configured to perform lens shading correction with all of the RAW images or images according to channels, which are acquired from the multispectral image sensor, using the correction map generated for each of the first channels.

The correction table may include first correction data for each of the first channels, and the first correction data may include a scale factor, an offset, an incidence angle, and/or a curve fitting coefficient corresponding to estimated illumination spectral data.

Although not shown in FIG. 13, the image acquisition apparatus may be configured to further perform white balance correction on the first image on which lens shading correction has been performed. The method of performing white balance correction will be described below with reference to FIG. 14.

Figure 14:
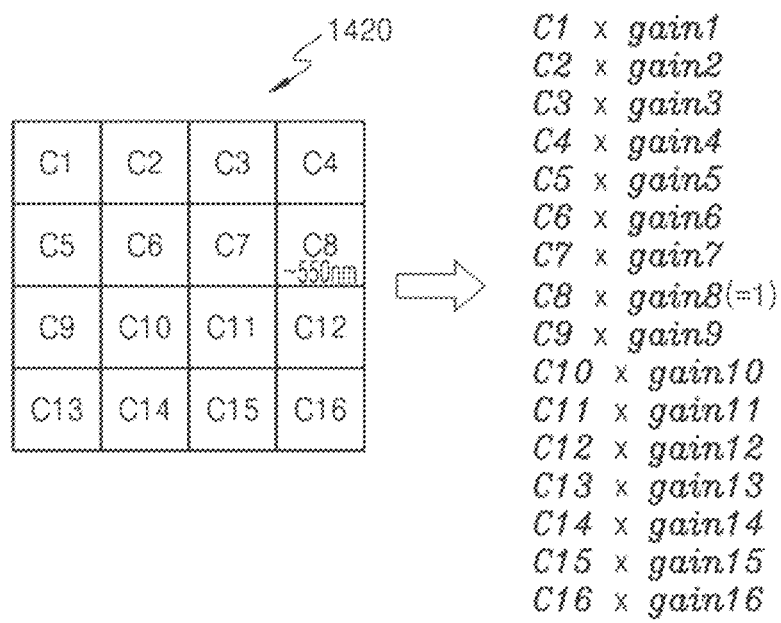
FIG. 14 is a diagram for describing a method of performing white balance correction on an image acquired from a multispectral image sensor, according to an embodiment.

FIG. 14 is a diagram for describing a method of performing white balance correction on the image acquired from the multispectral image sensor according to an embodiment.

As the multispectral image sensor the RGB image sensor are configured to sense light through the channels, color of the image may vary according to at least one illumination source existing in an environment in which the multispectral image sensor acquires the image. That is, color of the image acquired with respect to a sheet of white paper acquired by the multispectral image sensor in an environment in which at least one illumination source exists may be not implemented as white. White balance correction indicates a correction method of preventing change in the color of the image due to at least one illumination source and implementing inherent color of the object as much as possible in acquired images.

Performance of white balance correction on the image acquired by the RGB image sensor may indicate determining a gain with respect to each of pixels corresponding to a red wavelength band and pixels corresponding to a blue wavelength band, with reference to pixels corresponding to a green wavelength band. A signal-to-noise ratio (SNR) of the RGB image sensor with respect to the green wavelength band may significantly influence the quality of image acquired by the RGB image sensor. Accordingly, the image acquisition apparatus may set the gain of a pixel corresponding to the green wavelength band to be 1 and set a gain of a pixel corresponding to a wavelength band apart from the green wavelength band to be less than 1, and by doing so, the image acquisition apparatus may correct the image acquired from the RGB image sensor to be implemented similar to a distinct color of the image as much as possible.

The aforementioned method of performing white balance correction with respect to the image acquired by the RGB image sensor may be partially used in a method of performing white balance correction with respect to the image acquired by the multispectral image sensor.

Referring to FIG. 14, the image acquisition apparatus (e.g., the image acquisition apparatus 10 shown in FIGS. 1, 2A, 2B, and 10) may be configured to estimate illumination spectral data based on acquired images and perform white balance correction based on the estimated illumination spectral data. The image acquisition apparatus may use white balance coefficients according to pixels to perform white balance correction, and the white balance coefficients may be determined based on MSFA patterns 1420 corresponding thereto.

The MSPA patter 1420 shown in FIG. 14 may be identical or similar to the MSPA pattern 820 shown in FIG. 8. For example, the eighth unit color filter C8 of the MSPA patter 1420 may be configured to sense an intensity of a channel signal corresponding to a channel of the multispectral image sensor for a green wavelength band of 550 nm.

The white balance coefficients according to pixels may indicate gains corresponding to the unit color filters C1 to C16. The image acquisition apparatus may be configured to set a value of an eighth gain gain 8 corresponding to the eighth unit color filter C8 to be 1, give a gain greater than the eighth gain gain 8 to a unit color filter having a channel signal of an intensity less than the intensity of the channel signal of the eighth unit color filter C8, and give a gain less than the eight gain gain 8 to a unit color filter having a channel signal of an intensity greater than the intensity of the channel signal of the eighth unit color filter C8. However, the white balance coefficients according to pixels are not limited thereto. As another example, the sixteenth unit color filter C16 may bypass white balance correction, and in this case, a channel corresponding to the sixteenth unit color filter C16 may include a channel configured to sense an entire wavelength band of from 400 nm to 700 nm.

The image acquisition apparatus may be configured to estimate illumination spectral data from the image acquired by the multispectral image sensor and determine the white balance coefficients according to pixels according to estimated illumination spectral data. The image acquisition apparatus may use the determined white balance coefficients according to pixels to perform white balance correction on the image on which lens shading correction has been performed.

Figure 15:
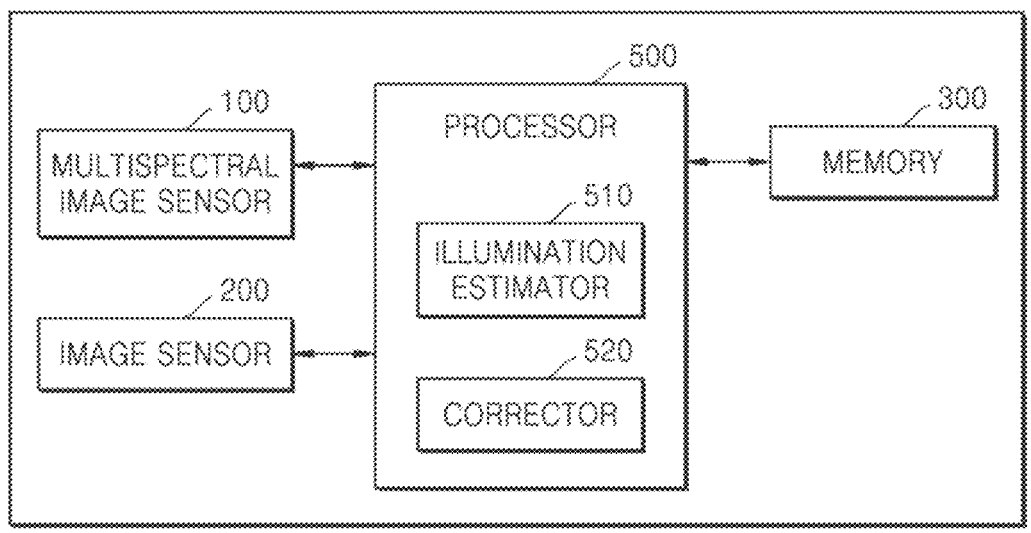
FIG. 15 is a detailed block diagram of the image acquisition apparatus shown in FIG. 2B.

FIG. 15 is a detailed block diagram of the image acquisition apparatus 20 shown in FIG. 2B.

Referring to FIG. 15, compared with the image acquisition apparatus 10 shown in FIG. 10, the image acquisition apparatus 20 shown in FIG. 15 may further include the image sensor 200. Hereinafter, with respect to the multispectral image sensor 100, the processor 500, and the memory 300, same descriptions as those of the image acquisition apparatus 10 shown in FIG. 10 will be omitted.

The multispectral image sensor 100 may be configured to acquire a first image for the object through a plurality of first channels in an environment in which particular illumination sources exist, and the image sensor 200 may be configured to acquire a second image for the object through less than four second channels in the environment in which the particular illumination sources exist.

The multispectral image sensor 100 may include a sensor in which color calibration has been performed on one or more illumination sources. By a color space conversion matrix, channel signals corresponding to the channels of the multispectral image sensor 100 may be converted to XYZ signals of an XYZ color space. The XYZ signal in the XYZ color space may be independent to spectral sensitivity of the multispectral image sensor 100 and subject to spectral sensitivity recognized by human eyes.

The processor 500 may be configured to estimate illumination spectral data of the first image using channel signals corresponding to the first channels. The processor 500 may be configured to perform lens shading correction with respect to the second image based on the estimated illumination spectral data. In addition, the processor 500 may be configured to perform white balance correction on the image on which lens shading correction has been performed, based on the estimated illumination spectral data. The processor 500 may be configured to perform parallax correction on the first image and the second image. For example, the processor 500 may be configured to align the first image and the second image or perform affine transformation with respect to the first image and the second image.

The correction table corresponding to the illumination spectral data may be stored in the memory 300. The correction table may include the correction data with respect to each of the plurality of channels of the multispectral image sensor 100. The image acquired from the multispectral image sensor 100 may include a plurality of segmented areas, and the correction table may include correction data corresponding to a corner of a grid of each of the plurality of segmented areas. The grid may segment each of the plurality of areas into uniform or non-uniform areas.

Correction data for performing lens shading correction using a scale factor and/or an offset corresponding to the estimated illumination spectral data may be stored in the memory 300. The input data ( ) related to the image acquired from the multispectral image sensor 100 may indicate an intensity of the channel signal corresponding to each of the plurality of channels of the multispectral image sensor 100. The processor 500 may be configured to perform lens shading correction with respect to the acquired image by inputting the input data ( ) to Equation 4 and/or Equation 5 and output output data ( ) related to the image on which lens shading correction has been performed.

Correction data for performing lens shading correction using an incidence angle corresponding to the estimated illumination spectral data may be further stored in the memory 300. The processor 500 may be configured to perform lens shading correction with respect to the acquired image by inputting the input data ( ) to Equation 6 and outputting the output data ( ) related to the image on which lens shading correction has been performed.

The memory 300 according to another embodiment may further store correction data for performing lens shading correction using a curve fitting coefficient corresponding to the estimated illumination spectral data, in addition to the correction data for performing lens shading correction using the scale factor and/or the offset corresponding to the estimated illumination spectral data.

However, the correction data stored in the memory 300 is not limited to the aforementioned embodiments. A memory according to another embodiment may store correction data including an appropriate combination of a scale factor, an offset, an incidence angle, and/or a curve fitting coefficient corresponding to the estimated illumination spectral data.

The processor 500 may be configured to receive, from the memory 300, the correction table corresponding to the estimated illumination spectral data, and may also be configured to perform lens shading correction with respect to the image acquired from the multispectral image sensor 100 using the correction table that has been received.

The processor 500 may be configured to generate a correction map with respect to each of the channel of the multispectral image sensor 100 by performing linear interpolation with respect to the correction table corresponding to the estimated illumination spectral data. The processor 500 may be configured to perform, using the generated correction map 1220, lens shading correction with respect to all of RAW images (e.g., the RAW image 610 shown in FIG. 6) or images according to channels (e.g., the images according to channels 620 shown in FIG. 6) acquired from the multispectral image sensor 100.

The processor 500 may be configured to estimate the illumination spectral data from the image acquired by the multispectral image sensor 100 and determine white balance coefficients according to pixels based on the estimated illumination spectral data. The processor 500 may use determined white balance coefficients according to pixels to perform white balance correction on the image on which lens shading correction has been performed.

Figure 16:
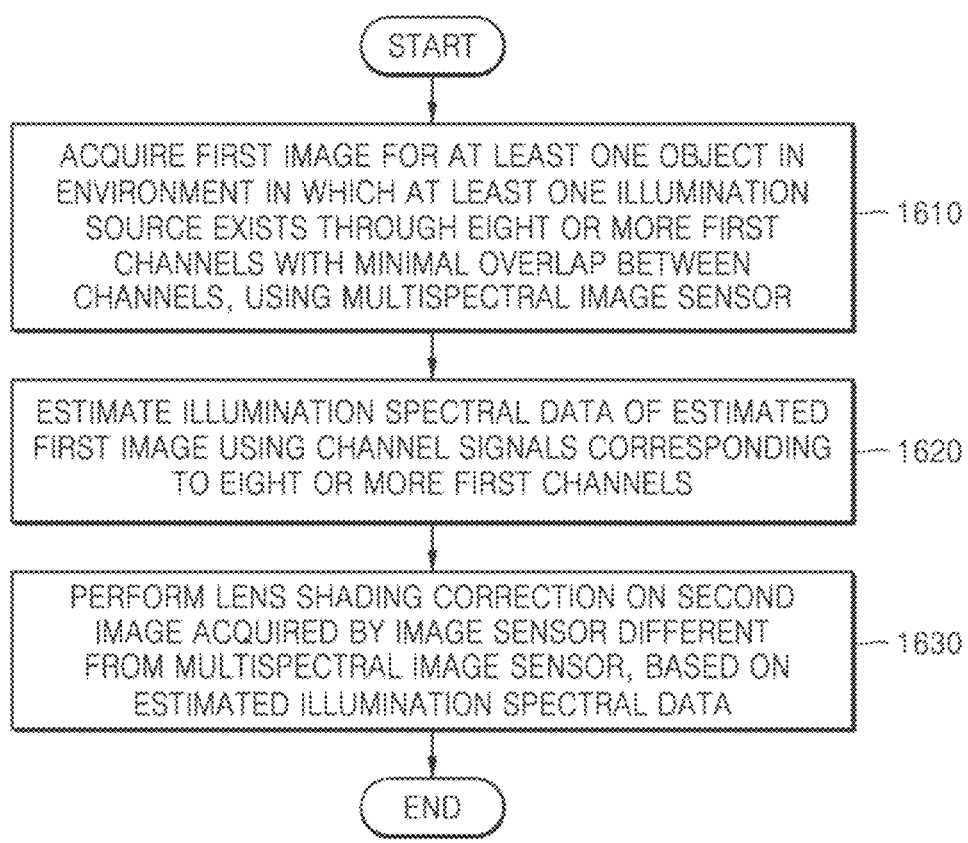
FIG. 16 is a flowchart of a method of performing lens shading correction on an image acquired from an image sensor, according to an embodiment.

FIG. 16 is a flowchart of a method of performing lens shading correction with respect to an image acquired from an image sensor according to an embodiment.

The method shown in FIG. 16 may be performed by an image acquisition apparatus (e.g., the image acquisition apparatus 20 shown in FIG. 15), and descriptions above with reference to FIGS. 1 to 15 may be applied to the method shown in FIG. 16, even though the description are omitted below.

In operation 1610, a processor (e.g., the processor 500 shown in FIG. 15) may use a multispectral image sensor (e.g., the multispectral image sensor 100 shown in FIG. 15) to acquire a first image for at least one object in an environment in which at least one illumination source exists through eight or more first channels with minimal overlapping between the channels. The multispectral image may include a sensor on which color calibration has been previously performed.

In addition, the processor may use an image sensor (e.g., the image sensor 200 shown in FIG. 15) to additionally acquire a second image for the object in an environment in which the illumination source exists, through less than four second channels. The processor may be configured to perform parallax correction with respect to the first image and the second image. For example, the processor may be configured to align the first image and the second image or perform affine transformation with respect to the first image and the second image.

In operation 1620, the processor may be configured to estimate illumination spectral data of the first image acquired using the channel signals corresponding to the eight or more first channels. Furthermore, the processor may be configured to estimate the illumination spectral data additionally using channel signals corresponding to less than four second channels in addition to the channel signals corresponding to the eight or more first channels.

The illumination spectral data may include the information regarding intensities of the channel signals acquired from the multispectral image sensor according to wavelengths. For example, the image acquisition apparatus may be configured to generate an MSFA pattern (e.g., the MSFA patter 820 shown in FIG. 820) corresponding to estimated illumination spectral data.

In operation 1630, the image acquisition apparatus may be configured to perform lens shading correction on the second image based on the estimated illumination spectral data. The image acquisition apparatus may be configured to generate a correction map with respect to the four or more second channels of the image sensor by performing linear interpolation with respect to the correction table corresponding to the estimated illumination spectral data. The image acquisition apparatus may be configured to perform lens shading correction with respect all of the RAW images or images according to channels, which are acquired from the multispectral image sensor, using the correction map generated for each of the second channels.

The correction table may include the first correction data for each of the first channels, and the first correction data may include the scale factor, the offset, the incidence angle, and/or the curve fitting coefficient corresponding to the estimated illumination spectral data.

Although not shown in FIG. 16, the image acquisition apparatus may be configured to further perform white balance correction on the second image on which lens shading correction has been performed. A method of performing white balance correction on the second image on which lens shading correction has been performed may be identical to the method of performing white balance correction on the first image on which lens shading correction has been performed, the method described with reference to FIG. 14.

Figure 17:
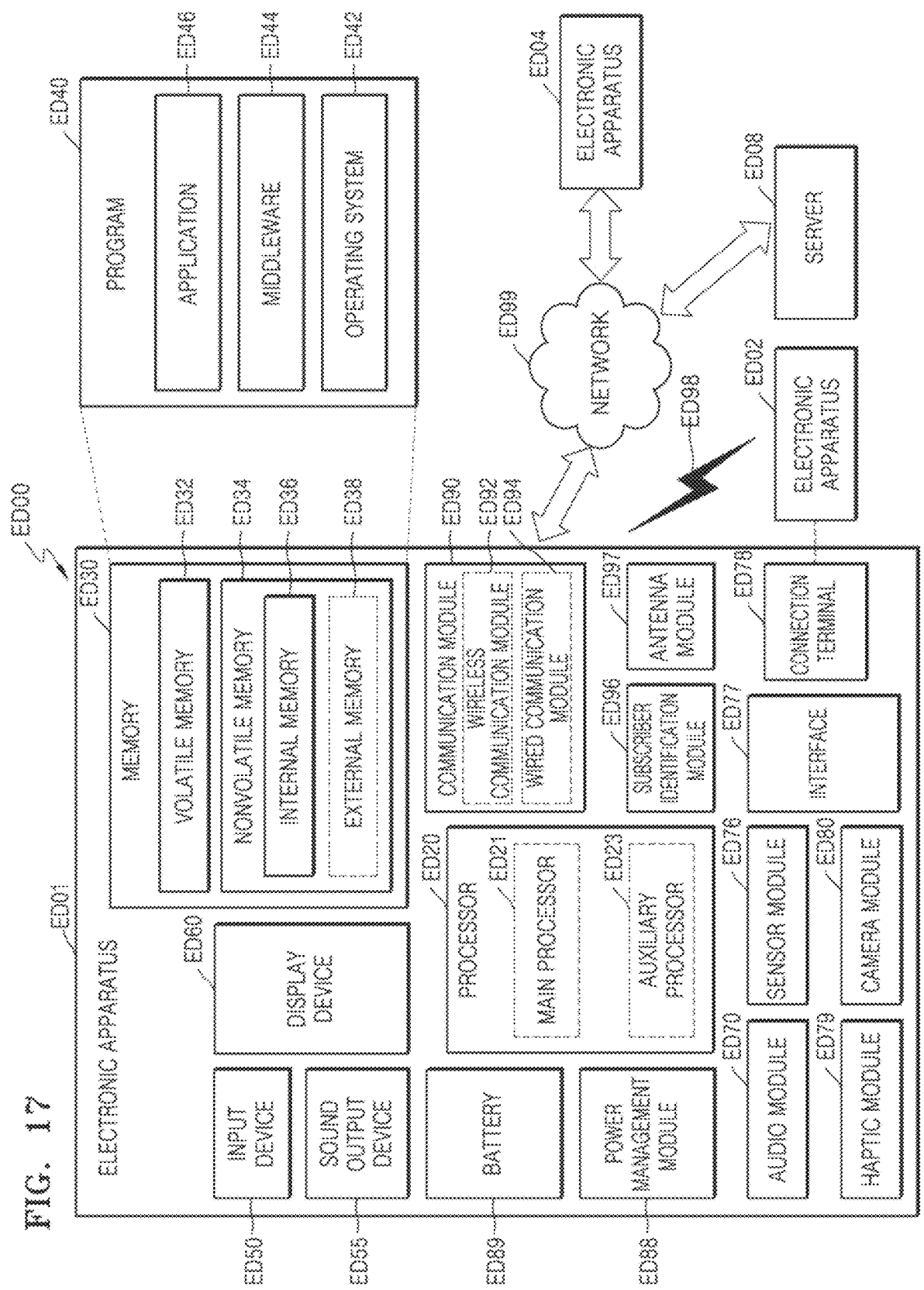
FIG. 17 is a block diagram of a configuration of an electronic device according to an embodiment.

FIG. 17 is a block diagram of a configuration of an electronic device ED01 according to an embodiment;

Referring to FIG. 17, in a network environment ED00, the electronic device ED01 may be configured to communicate with another electronic device ED02 through a first network ED98 (a near-field wireless communication network and the like) or communicate with another electronic device ED04 and/or a sever ED08 through a second network ED99 (a far-field wireless communication network and the like). The electronic device ED01 may be configured to communicate with the electronic device ED04 through the server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (e.g., the display device ED60 and the like) of the aforementioned may be omitted or other components may be added in the electronic device ED01. Some of the components may be implemented as one integrated circuit. For example, the sensor module ED76 (a fingerprint sensor, an iris sensor, a luminance sensor, and the like) may be embedded and implemented in the display device ED60 (a display and the like).

The processor ED20 may be configured to control one or more other components (hardware, software components) connected to the processor ED20 and perform various data processing or calculation by executing software such as the program ED40. As a part of data processing or operation, the processor ED20 may be configured to load instructions and/or data received from other components (e.g., the sensor module ED76, the communication module E90, and the like) to a volatile memory device ED32, process the instructions and/or data stored in the volatile memory ED32, and store result data in a non-volatile memory ED34. The processor ED20 may include a main processor ED21 (a central processing unit, an application processor, and the like) and an auxiliary processor ED23 (a graphic processing unit, an image signal processor, a sensor hub processor, a communication processor, and the like) that may be operated independently from or simultaneously with the main processor ED21. The auxiliary processor ED23 may have power consumption less than power consumption of the main processor ED21 and may be configured to perform specialized functions.

While the main processor ED21 is in an inactive state (a sleep state) or an active state (an application execution state), the auxiliary processor ED23 may control functions and/or states related to some of the components (the display device ED60, the sensor module ED76, the communication module ED90, and the like) of the electronic device ED01, in the place of main processor ED21 or simultaneously with the main processor ED21. The auxiliary processor ED23 (an image signal processor, a communication processor, and the like) may also be implemented as a part of another component (the camera module ED80, the communication module ED90, and the like) functionally related to the auxiliary processor ED23.

The memory ED30 may store various types of data needed for the components (the processor ED20, the sensor module ED76, and the like) of the electronic device ED01. The data may include, for example, software (e.g., the program ED40 and the like) and input data and/or output data regarding instructions related to the software. The memory ED30 may include the volatile memory ED32 and/or the non-volatile memory ED34. The non-volatile memory ED32 may include an embedded memory ED36 mounted in the electronic device ED01 in a fixed manner and an external memory ED38 that is detachable.

The program ED40 may be stored in the memory ED30 as software, and may include an operation system ED42, middleware ED44, and/or an application ED46.

The input device ED50 may be configured to receive instructions and/or data to be used for the components (e.g., the processor ED20 and the like) of the electronic device ED01 from the outside (e.g., a user) of the electronic device ED01. The input device ED50 may include a microphone, a mouse, a keyboard, and/or a digital pen (a stylus pen and the like).

The audio output device ED55 may be configured to output audio signals to the outside of the electronic device ED01. The audio output device ED55 may include a speaker and/or a receiver. The speaker may be used for general purposes, such as replaying multimedia or records, and the receiver may be used for receiving incoming calls. The receiver may be combined to the speaker as a part thereof or may be implemented as a separated device.

The display device ED60 may provide information to the outside of the electronic device ED01 in a visual manner. The display device ED60 may include a display, a hologram device, or a projector, and a control circuit configured to control the aforementioned devices. The display device ED60 may include a touch circuitry configured to sense touches and/or a sensor circuitry (a pressure sense and the like) configured to measure a magnitude of force generated by touch.

The audio module ED70 may be configured to convert sound into electronic signals, or vice versa. The audio module ED70 may be configured to acquire sound through the input device ED50 or output sound through a speaker and/or a headphone of another electronic device (e.g., the electronic device ED02) directly or wirelessly connected to the audio output device ED55 and/or the electronic device ED01.

The sensor module ED76 may be configured to sense an operation state (power, temperature, and the like) of the electronic device ED01 or an environmental state (state of a user and the like) of the outside and generate an electronic signal and/or a data value corresponding to sensed states. The sensor module ED76 may include a gesture sensor, a gyro sensor, an atmospheric pressure sensor, a magnetic sensor, an acceleration sensor, a grip sensor, a proximity sensor, a color sensor, an infrared sensor, a biomaterial sensor, a temperature sensor, a humidity sensor, and/or a luminance sensor.

The interface ED77 may support one or a plurality of designated protocols that may be used for direct or wireless connection between the electronic device ED01 and another electronic device (e.g., the electronic device ED02). An interface ED77 may include a high definition multimedia interface (HDMI), a universal serial bus (USB) interface, an SD card interface, and/or an audio interface.

A connection terminal ED78 may include a connector through which the electronic device ED01 may be physically connected to another electronic device (e.g., the electronic device ED02 and the like). The connection terminal ED78 may include an HDMI connector, USB connector, an SD card connector, and/or an audio connector (a headphone connector and the like).

The haptic module ED79 may be configured to convert an electric signal into mechanical stimulation (vibration, motions, and the like) or electrical stimulation that may be recognized by the user through tactile or motion sense. The haptic module ED79 may include a motor, a piezoelectric device, and/or an electrical stimulation device.

The camera module ED80 may be configured to capture still images or videos. The camera module Ed80 may include the image acquisition apparatus 10 and/or the image acquisition apparatus 20 described above, and may further include a lens assembly, image signal processors, and/or flashes. The lens assembly included in the camera module ED80 may be configured to collect light emitted from the object that is the subject of image capturing.

The power management module ED88 may be configured to manage power provided to the electronic device ED01. The power management module ED88 may be implemented as a part of a power management integrated circuit (PMIC).

The battery ED89 may be configured to provide power to the components of the electronic device ED01. The battery ED89 may include a disposable primary battery, a rechargeable secondary battery, and/or a fuel battery.

The communication module ED90 may support establishment of a direct (wired) communication channel and/or a wireless communication channel between the electronic device ED01 and another electronic device (e.g., the electronic device ED02, the electronic device ED04, the server ED08, and the like) and communication through the communication channel that has been established. The communication module ED90 may include one or a plurality of communication processors operated independent from the processor ED20 (e.g., the application processor) and directly supporting communication and/or wireless communication. The communication module ED90 may include a wireless communication module ED92 (a cellular communication module, a near-field wireless communication module, a global navigation satellite system (GNSS) communication module, and the like), and/or a wired communication module ED94 (a local area network (LAN) communication module, a power line communication module, and the like). Among the aforementioned communication module, a corresponding communication module may be configured to communicate with other electronic devices through a first network ED98 (a near-field communication network such as Bluetooth, WiFi Direct, or Infrared Data Association (IrDA)) or a second network ED99 (a far-field communication network such as a cellular network, the Internet, or a computer network (LAN, WAN, and the like)). Various types of communication modules mentioned above may be integrated into one component (e.g., a single chip) or a plurality of separate components (e.g., a plurality of chips). The wireless communication module ED92 may be configured to confirm and authenticate the electronic device ED01 in a communication network such as the first network ED98 and/or the second network ED99 using subscribe information (e.g., IMSI) stored in the subscriber identification module ED96.

The antenna module ED97 may be configured to transmit/receive a signal and/or power to/from the outside (e.g., another electronic device). The antenna may include a radiator including a conductive pattern formed on a substrate (e.g., a PCB). The antenna module ED97 may include one or a plurality of antennas. When the antenna module ED97 includes the plurality of antennas, an antenna appropriate for communication used in the communication network such as the first network ED98 and/or the second network ED99 may be selected from among the plurality of antennas by the communication module ED90. Signals and/or power may be transmitted or received through the selected antenna between the communication module ED90 and another electronic device. In addition to the antenna, other members (e.g., an RFIC) may be included as a part of the antenna module ED97.

Some of the components may be connected to one another and exchange signals (instructions, data, and the like) through a communication scheme (a bus, General Purpose Input and Output (GPIO), Serial Peripheral Interface (SPI), Mobile Industry Processor Interface (MIPI), and the like) among peripheral devices.

The instructions and data may be transmitted or received between the electronic device ED01 and the electronic device ED04 of the outside through the sever ED08 connected to the second network ED99. Other electronic devices (e.g., the electronic device Ed02 and the electronic device ED04) may include types of devices identical to or different from the electronic device ED01. All or some of operations performed by the electronic device ED01 may be performed by one or a plurality of devices among other electronic devices (e.g., the electronic device ED02, the electronic device ED04, and the server ED08). For example, when the electronic device ED01 is required to perform certain functions or services, instead of autonomously performing the functions or services, the electronic device ED01 may request one or a plurality of other electronic devices to perform some or all of the functions or services. The one or the plurality of other electronic devices upon receipt of the request perform additional functions or services related to the request and transmit results of the performance to the electronic device ED01. To do so, cloud computing technology, distributed computing, and/or client-server computing technology may be used.

Figure 18:
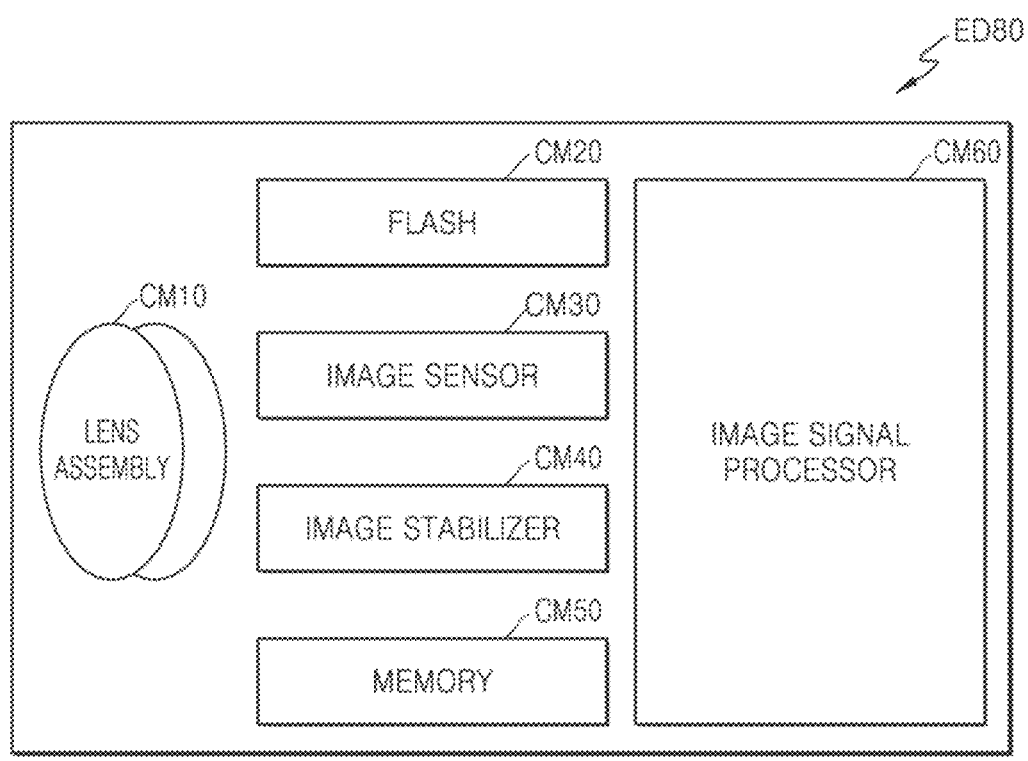
FIG. 18 is a block diagram of a camera module provided in the electronic device shown in FIG. 17.

FIG. 18 is a block diagram of the camera module ED80 provided in the electronic device shown in FIG. 17; and The camera module Ed80 may include the image acquisition apparatus 10 and/or the image acquisition apparatus 20 described above, or may have structures modified from the image acquisition apparatus 10 and/or the image acquisition apparatus 20. Referring to FIG. 18, the camera module ED80 may include a lens assembly CM10, a flash CM20, an image sensor CM30, an image stabilizer CM40, a memory CM50 (e.g., a buffer memory), and/or an image signal processor CM60.

The image sensor CM30 may include the multispectral image sensor 100 provided in the aforementioned image acquisition apparatus 10. The multispectral image sensor 100 may be configured to acquire an image corresponding to the object by converting light, which is emitted or reflected from the object and delivered through the lens assembly CM10, into electrical signals. The multispectral image sensor 100 may be configured to acquire hyperspectral images in an ultraviolet or infrared wavelength range.

In addition to the multispectral image sensor 100 described above, the image sensor CM30 may further include one or a plurality of sensors selected from among image sensors having different features, such as another image sensor (e.g., the image sensor 200 shown in FIG. 2B or 15), a black and white sensor, an IR sensor, or a UV sensor. Each of the sensors included in the image sensor CM30 may be implemented as a charged coupled device (CCD) sensor and/or a complementary metal oxide semiconductor (CMOS) sensor.

The lens assembly CM10 may be configured to collect light emitted from the object that is the subject of image capturing. The camera module ED80 may also include a plurality of lens assemblies CM10, and in this case, the camera module ED80 may include a dual camera, a 360-degree camera, or a spherical camera. Some of the plurality of lens assemblies CM10 may have same lens features (e.g., a quadrant, a focal distance, an auto focus, an F number, an optical zoom), or may have other lens features. The lens assembly CM10 may include a wide-angle lens or a telephoto lens.

The lens assembly CM10 may be configured and/or focus-controlled such that two image sensors provided in the image sensor CM30 may form an optical image of the subject at a same position.

The flash CM20 may be configured to emit light used for enhancing the light emitted or reflected from the object. The flash CM30 may include one or a plurality of light-emitting diodes (a red-green-blue (RGB) LED, a white LED, an infrared LED, an ultraviolet LED, and the like), and/or a xenon lamp.

The image stabilizer CM40 may be configured to move one or a plurality lens included in the lens assembly CM10 or the multispectral image sensor 100 in response of the camera module ED80 or the electronic device CM01 (ED01?) of control (e.g., adjustment of the read-out timing) operation characteristics of the multispectral image sensor 100 such that negative influences due to the motions. The image stabilizer CM40 may be configured to motions of the camera module ED80 or the electronic device ED01 using a gyro sensor (not shown) or the accelerator (not shown) arranged inside or outside the camera module ED80. The image stabilizer CM40 may be implemented in an optical manner.

The memory CM50 may be configured to store, through the multispectral image sensor 100, some or all of data of the acquired image for a next image processing operation. For example, when a plurality of images are acquired at a high rate, raw data (Bayer-patterned data, high-resolution data, and the like) that has been acquired may be stored in the memory CM50, only low-resolution data may be displayed and used for transmission of the raw data of selected images (e.g., selected by the users) to the image signal processor CM60. The memory CM50 may be integrated as the memory ED30 of the electronic device ED01, or may be configured as a memory separately operated.

The image signal processor CM60 may be configured to perform image processing with respect to the image acquired through the image sensor CM30 or image data stored in the memory CM50. The image signal processor CM60 may be identical to or different from the processor 500 described with reference to FIG. 2, 3, 10, or 15. The image processing may include generation of a depth map, three-dimensional modeling, generation of a panorama, extraction of key points, synthesis of image, and/or compensation of image (noise reduction, adjustment of resolution, adjustment of illuminance, blurring, sharpening, softening, and the like). The image signal processor CM60 may perform control (control on an exposure time, control on a read out timing, and the like) on the components (e.g., the image sensor CM30) included in the camera module ED80. The image processed by the image signal processor CM60 may be re-stored in the memory CM50 for additional processing or provided to external components (e.g., the memory ED30, the display device Ed60, the electronic device ED02, the electronic device ED04, or the server ED08) of the camera module ED80. The image signal processor CM60 may be integrated into the processor ED20 or configured to as a separate processor that is operated independent of the processor ED20. When the image signal processor CM60 includes the processor ED20 and another processor, the image processed by the image signal processor CM60 may be additionally processed by the processor ED20 and then may be displayed through the display device ED60.

The electronic device ED01 may include a plurality of camera modules ED80 respectively having different features or functions. In this case, one of the plurality of camera modules ED80 may include a wide-angle camera, and another one of the plurality of camera modules ED80 may include a telephoto camera. Similarly, one of the plurality of camera modules ED80 may include a front camera, and another one of the plurality of camera modules ED80 may include a rear camera.

FIGS. 19 to 28 are diagrams illustrating various examples of an electronic device to which the image acquisition apparatus 10 according to example embodiments is to be applied.

Figure 19:
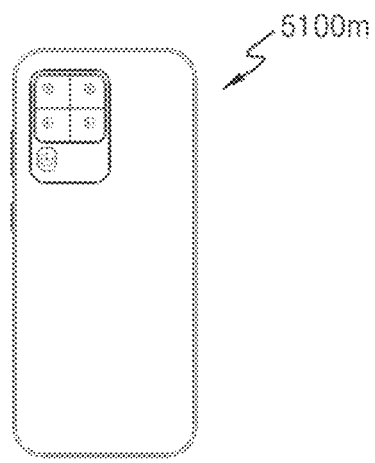
FIGS. 19 to 28 are diagrams illustrating various examples of an electronic device to which an image acquisition apparatus according to example embodiments are to be applied.
Figure 20:
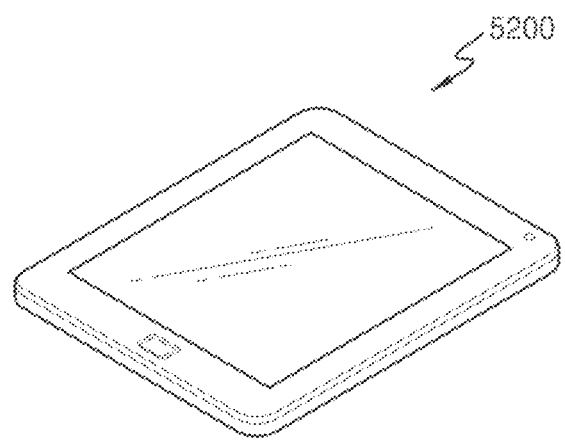
Figure 21:
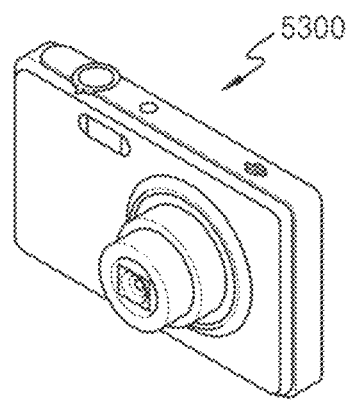
Figure 22:
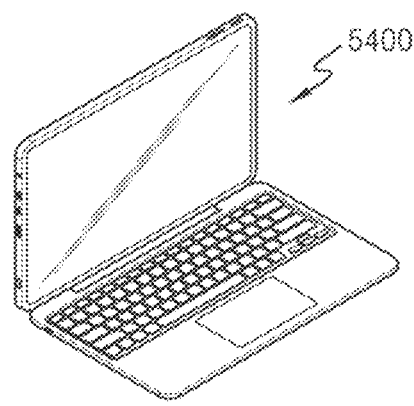
Figure 23:
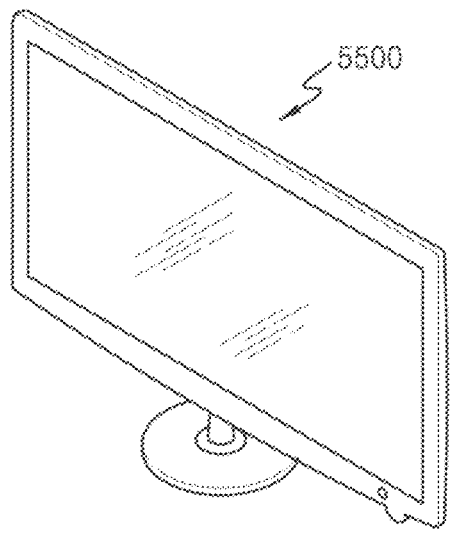
Figure 24:
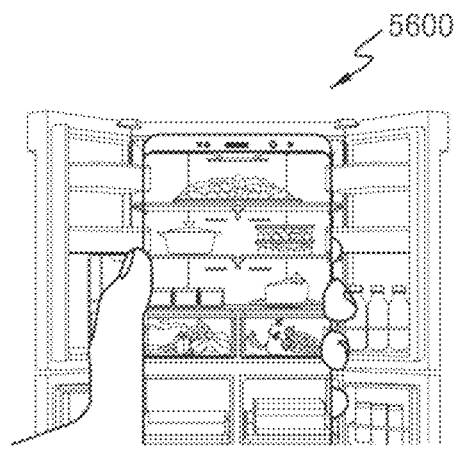

The image acquisition apparatus 10 according to the embodiments may be applied to a mobile phone or a smart phone 5100m shown in FIG. 19, a tablet or a smart tablet 5200 shown in FIG. 20, a digital camera or a camcorder 5300 shown in FIG. 21, a notebook computer 5400 shown in FIG. 22, or a television or a smart television 5500 shown in FIG. 23. For example, the smart phone 5100m or the smart tablet 5200 may include a plurality of high-resolution cameras each including a high-resolution image sensor. The high-resolution cameras may be used to extract depth information of the objects in the image, adjust outfocusing of the image, or automatically recognize the objects in the image.

The image sensor 200 may be arranged near the image acquisition apparatus 20 including the image sensor, and may be configured to support the front camera or the rear camera. The smart phone 5100m may include a plurality of rear cameras, and the plurality of rear cameras may have focal distances equal to or different from one another. The image acquisition apparatus may be configured to estimate illumination spectral data using the multispectral image sensor 100 and transmit the estimated illumination spectral data to all of the plurality of rear cameras. The image acquisition apparatus 10 may be configured to perform same white balance correction with respect to images acquired from the plurality of rear cameras using the estimated illumination spectral data. Accordingly, the image acquisition apparatus 10 may be configured to stably perform white balance correction with respect to images acquired from the plurality of rear cameras having different focal distances.

Figure 25:
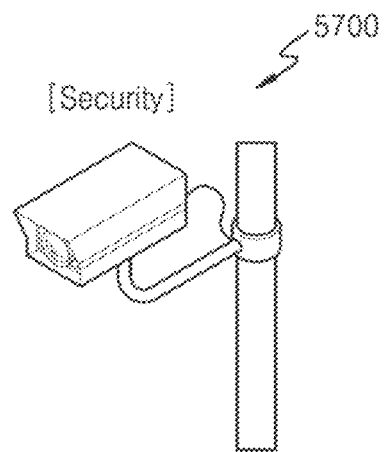
Figure 26:
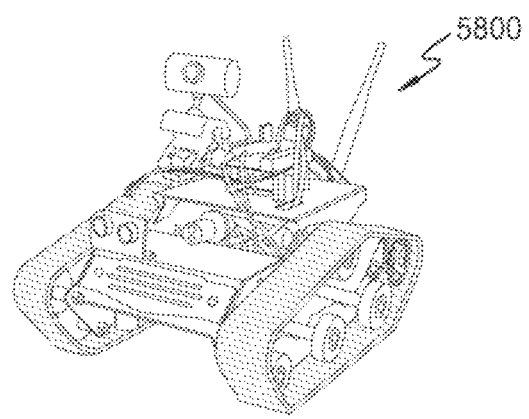
Figure 27:
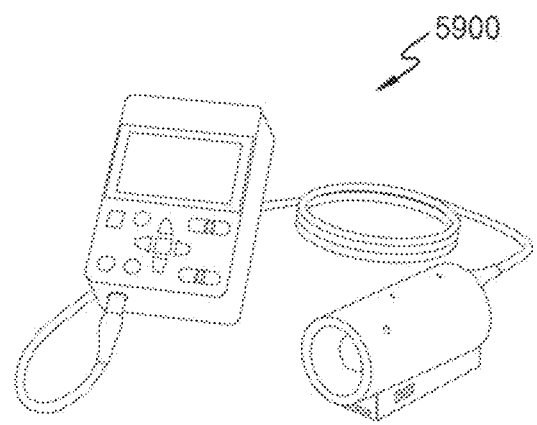

In addition, the image acquisition apparatus 10 may be applied to a smart refrigerator 5600, a security camera 5700 shown in FIG. 25, a robot 5800 shown in FIG. 26, a medical camera 5900 shown in FIG. 27, and the like. For example, the smart refrigerator 5600 may be configured to automatically recognize foods in the refrigerator using the image acquisition apparatus 10 and notify the user, through a smart phone, whether certain food exists in the refrigerator, types of food put in or put out, and the like. The security camera 5700 may provide an ultra-high resolution image and may help the user recognize objects or people in images in dark environments using high sensitivity. The robot 5800 may be introduced into a disaster or an industry field, to which a human is not directly accessible, to provide high-resolution images. The medical camera 5900 may be configured to provide high-resolution images for diagnosis or operations and dynamically adjust viewing angles.

Figure 28:
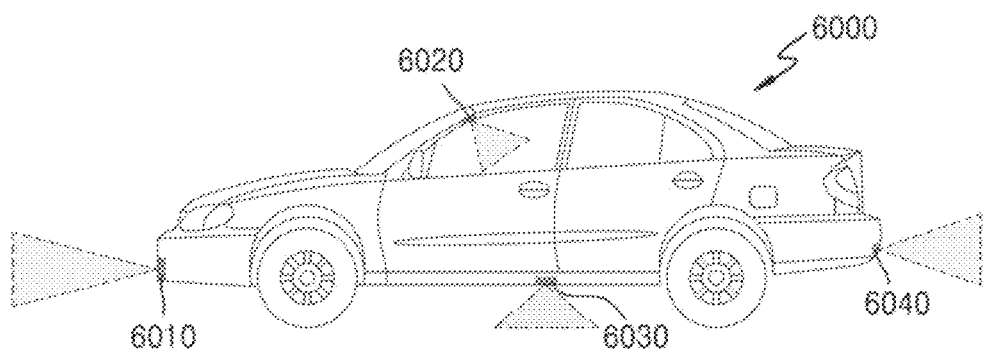

In addition, the image acquisition apparatus 10 may be applied to a vehicle 6000, as shown in FIG. 28. The vehicle 6000 may include a plurality of vehicle cameras 6010, 6020, 6030, and 6040 arranged at various positions, and each of the vehicle cameras 6010, 6020, 6030, and 6040 may include an image acquisition apparatus according to embodiments. The vehicle 6000 may be configured to provide various information regarding inside or a peripheral area of the vehicle 6000 to the user using the plurality of vehicle cameras 6010, 6020, 6030, and 6040, and may also be configured to automatically recognize things or people in images and provide information required for autonomous driving.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image acquisition apparatus comprising:
   a multispectral image sensor configured to acquire an image of at least one object in an environment in which at least one illumination source exists, through eight or more channels; and
   a processor configured to:
   estimate illumination spectral data of the image by using channel signals corresponding to the eight or more channels; and
   perform lens shading correction on the image by generating a correction map for each of the eight or more channels through linear interpolation of correction data included in a correction table, and applying the lens shading correction to the image using the correction map,
   wherein the correction table comprises correction data for each of the eight or more channels, and the correction data comprise an offset and an incidence angle that correspond to the illumination spectral data.

2. The image acquisition apparatus of claim 1, wherein the processor is further configured to perform, by using the correction map, the lens shading correction on all of raw images acquired from the multispectral image sensor.

3. The image acquisition apparatus of claim 1,
   wherein the processor is further configured to estimate the illumination spectral data, based on eight or more basis vectors related to reflection characteristics of the at least one object included in the image, a number of the channels, and a number of pixels in the image.

4. The image acquisition apparatus of claim 1, wherein the processor is further configured to estimate the illumination spectral data by using a pre-trained machine learning model.

5. The image acquisition apparatus of claim 1, wherein the processor is further configured to segment the image into a plurality of areas and estimate the illumination spectral data for each of the plurality of areas.

6. The image acquisition apparatus of claim 1, wherein the illumination spectral data comprises a color vector of the illumination source in a color.

7. The image acquisition apparatus of claim 1, wherein the processor is further configured to further perform white balance correction on the image on which the lens shading correction has been performed, based on the illumination spectral data.

8. The image acquisition apparatus of claim 1, wherein, in the multispectral image sensor, color calibration is performed on the at least one illumination source.

9. An image acquisition apparatus comprising:
   a multispectral image sensor configured to acquire a first image of at least one object, in an environment in which at least one illumination source exists, through eight or more first channels;
   an image sensor configured to acquire, through fewer than four second channels, a second image of the at least one object in the environment in which the at least one illumination source exists; and
   a processor configured to:
   estimate illumination spectral data of the first image by using channel signals corresponding to the eight or more first channels;
   perform lens shading correction on the second image by generating a correction map for each of the eight or more channels through linear interpolation of correction data included in a correction table, and applying the lens shading correction to the image using the correction map,
   wherein the correction table comprises correction data for each of the eight or more channels, and the correction data comprise an offset and an incidence angle that correspond to the illumination spectral data.

10. The image acquisition apparatus of claim 9, wherein the processor is further configured to perform parallax correction on the first image and the second image.

11. The image acquisition apparatus of claim 9, wherein the processor is configured to further perform, based on the illumination spectral data, white balance correction on the second image on which the lens shading correction has been performed.

12. A method of acquiring images, the method comprising:
   acquiring a first image of at least one object in an environment in which at least one illumination source exists, through eight or more first channels, by using a multispectral image sensor;
   estimating illumination spectral data of the first image by using channel signals corresponding to the eight or more first channels; and
   performing lens shading correction on the first image by generating a correction map for each of the first channels through linear interpolation of correction data included in a correction table, and applying the lens shading correction to the first image using the correction map,
   wherein the correction table comprises first correction data for each of the first channels, and the first correction data comprise an offset and an incidence angle that correspond to the illumination spectral data.

13. The method of claim 12,
   wherein the image sensor is configured to acquire, through fewer than four second channels, a second image of the at least one object in the environment in which the at least one illumination source exists through an image sensor different from the multispectral image sensor, and the performing of the lens shading correction comprises:
generating the correction map for each of the second channels by performing the linear interpolation on the correction data; and
performing the lens shading correction on the second image by using the correction map.

14. The method of claim 13,
wherein the performing of the lens shading correction comprises:
performing the lens shading correction on all of raw images acquired from the multispectral image sensor, by using the correction map generated for each of the first channels, or
performing the lens shading correction on all of the raw images, using the correction map generated for each of the second channels.

15. The method of claim 13,
wherein the correction table comprises second correction data with respect to each of the second channels, and
the second correction data comprise at least one of a scale factor, an offset, an incidence angle, and a curve fitting coefficient, corresponding to the illumination spectral data.

16. The method of claim 12, further comprising performing parallax correction on the first image and a second image that is acquired by an image sensor different from the multispectral image sensor.

17. The method of claim 12, further comprising, based on the illumination spectral data, performing white balance correction on the first image, on which the lens shading correction has been performed.

* * * * *